(12) United States Patent
Kronfeld et al.

(10) Patent No.: US 10,302,815 B1
(45) Date of Patent: May 28, 2019

(54) SYSTEM AND METHOD OF INTEGRATING GLOBAL CONVECTIVE WEATHER

(71) Applicants: Kevin M. Kronfeld, Cedar Rapids, IA (US); Arlen E. Breiholz, Cedar Rapids, IA (US); Venkata A. Sishtla, Marion, IA (US); Karen L. Walling, Cedar Rapids, IA (US); Ryan C. Fulton, Richmond, TX (US)

(72) Inventors: Kevin M. Kronfeld, Cedar Rapids, IA (US); Arlen E. Breiholz, Cedar Rapids, IA (US); Venkata A. Sishtla, Marion, IA (US); Karen L. Walling, Cedar Rapids, IA (US); Ryan C. Fulton, Richmond, TX (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 436 days.

(21) Appl. No.: 14/872,942

(22) Filed: Oct. 1, 2015

(51) Int. Cl.
*G01W 1/00* (2006.01)
*G01S 13/95* (2006.01)

(52) U.S. Cl.
CPC ............ *G01W 1/00* (2013.01); *G01S 13/953* (2013.01)

(58) Field of Classification Search
CPC . G01W 1/00; G01W 1/10; G01W 1/16; G01S 13/953
See application file for complete search history.

(56) References Cited

U.S. PATENT DOCUMENTS

| | | | |
|---|---|---|---|
| 650,275 A | 5/1900 | Reeve | |
| 3,251,057 A | 5/1966 | Buehler et al. | |
| 3,359,557 A | 12/1967 | Fow et al. | |
| 3,404,396 A | 10/1968 | Buchler et al. | |
| 3,465,339 A | 9/1969 | Marner | |
| 3,491,358 A | 1/1970 | Hicks | |
| 3,508,259 A | 4/1970 | Andrews | |

(Continued)

FOREIGN PATENT DOCUMENTS

| | | |
|---|---|---|
| EP | 1 329 738 B1 | 7/2003 |
| FR | 2658617 A1 | 8/1991 |

(Continued)

OTHER PUBLICATIONS

U.S. Appl. No. 14/086,844, filed Nov. 21, 2013, Rockwell Collins, Inc.

(Continued)

*Primary Examiner* — Manuel L Barbee
(74) *Attorney, Agent, or Firm* — Donna P. Suchy; Daniel M. Barbieri

(57) ABSTRACT

A method of providing convective weather data includes accessing lightning data, accessing statistical data representing a relationship between lightning flash rate data and at least one of reflectivity data and weather threat data, and accessing at least one of time of year data, geographic location data, temperature data, and altitude data. The method includes generating a lightning flash map based on the accessed lightning data, the accessed statistical data, and the at least one of time of year data, geographic location data, temperature data, and altitude data. The lightning flash map indicates at least one of reflectivity and a weather threat. The method provides the lightning flash map to an output port.

20 Claims, 14 Drawing Sheets

(56) References Cited

U.S. PATENT DOCUMENTS

| | | |
|---|---|---|
| 3,540,829 A | 11/1970 | Collinson et al. |
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,179,693 A | 12/1979 | Evans et al. |
| 4,223,309 A | 9/1980 | Payne |
| 4,240,108 A | 12/1980 | Levy |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A * | 3/1984 | Clark .............. G01S 13/953 342/26 B |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,937 A | 9/1986 | Batty, Jr. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,047,775 A | 9/1991 | Alitz |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,587 A | 5/1993 | Cornman |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,831,570 A | 11/1998 | Ammar et al. |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,936,552 A | 8/1999 | Wichgers et al. |
| 5,945,926 A | 8/1999 | Ammar et al. |
| 5,973,635 A | 10/1999 | Albo |
| 6,018,307 A | 1/2000 | Wakayama et al. |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,339,747 B1 | 1/2002 | Daly et al. |
| 6,340,946 B1 | 1/2002 | Wolfson et al. |
| 6,377,202 B1 | 4/2002 | Kropfli et al. |
| 6,381,538 B1 | 4/2002 | Robinson et al. |
| 6,384,830 B2 | 5/2002 | Baron et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,448,922 B1 | 9/2002 | Kelly |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |

(56) References Cited

U.S. PATENT DOCUMENTS

| | | |
|---|---|---|
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,039,505 B1 | 5/2006 | Southard et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,205,928 B1 | 4/2007 | Sweet |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,586 B2 | 12/2007 | Peshlov et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,365,674 B2 | 4/2008 | Tillotson et al. |
| 7,372,394 B1 | 5/2008 | Woodell et al. |
| 7,383,131 B1 | 6/2008 | Wey et al. |
| 7,411,519 B1 | 8/2008 | Kuntman et al. |
| 7,417,578 B1 | 8/2008 | Woodell et al. |
| 7,417,579 B1 | 8/2008 | Woodell |
| 7,427,943 B1 | 9/2008 | Kronfeld et al. |
| 7,436,361 B1 | 10/2008 | Paulsen et al. |
| 7,471,995 B1 | 12/2008 | Robinson |
| 7,486,219 B1 | 2/2009 | Woodell et al. |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,613 B1 | 5/2009 | Thompson et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,428 B1 | 12/2009 | McCusker et al. |
| 7,633,431 B1 | 12/2009 | Wey et al. |
| 7,656,343 B1 | 2/2010 | Hagen et al. |
| 7,664,601 B2 | 2/2010 | Daly, Jr. |
| 7,696,920 B1 | 4/2010 | Finley et al. |
| 7,696,921 B1 | 4/2010 | Finley et al. |
| 7,698,058 B2 | 4/2010 | Chen et al. |
| 7,714,767 B1 | 5/2010 | Kronfeld et al. |
| 7,728,758 B2 | 6/2010 | Varadarajan et al. |
| 7,733,264 B1 | 6/2010 | Woodell et al. |
| 7,859,448 B1 | 12/2010 | Woodell et al. |
| 7,868,811 B1 | 1/2011 | Woodell et al. |
| 7,869,953 B1 * | 1/2011 | Kelly .................. G01S 7/04 342/460 |
| 7,889,118 B1 | 2/2011 | Finley et al. |
| 7,917,255 B1 | 3/2011 | Finley |
| 7,932,853 B1 | 4/2011 | Woodell et al. |
| 7,973,698 B1 | 7/2011 | Woodell et al. |
| 7,982,658 B2 | 7/2011 | Kauffman et al. |
| 8,022,859 B2 | 9/2011 | Bunch et al. |
| 8,054,214 B2 | 11/2011 | Bunch |
| 8,072,368 B1 | 12/2011 | Woodell |
| 8,081,106 B2 | 12/2011 | Yannone |
| 8,089,391 B1 | 1/2012 | Woodell et al. |
| 8,098,188 B2 | 1/2012 | Costes et al. |
| 8,098,189 B1 | 1/2012 | Woodell et al. |
| 8,111,186 B2 | 2/2012 | Bunch et al. |
| 8,159,369 B1 | 4/2012 | Koenigs et al. |
| 8,217,828 B2 | 7/2012 | Kirk |
| 8,228,227 B2 | 7/2012 | Bunch et al. |
| 8,314,730 B1 | 11/2012 | Musiak et al. |
| 8,332,084 B1 | 12/2012 | Bailey et al. |
| 8,902,100 B1 | 12/2014 | Woodell et al. |
| 9,019,146 B1 | 4/2015 | Finley et al. |
| 9,134,418 B1 | 9/2015 | Kronfeld et al. |
| 9,244,166 B1 | 1/2016 | Finley et al. |
| 9,507,022 B1 | 11/2016 | Breiholz et al. |
| 9,535,158 B1 | 1/2017 | Breiholz et al. |
| 9,720,082 B1 | 8/2017 | Dana et al. |
| 2002/0039072 A1 | 4/2002 | Gremmert et al. |
| 2002/0126039 A1 | 9/2002 | Dalton et al. |
| 2003/0001770 A1 | 1/2003 | Cornell et al. |
| 2003/0025627 A1 | 2/2003 | Wilson et al. |
| 2003/0117311 A1 | 6/2003 | Funai |
| 2003/0193411 A1 | 10/2003 | Price |
| 2004/0183695 A1 | 9/2004 | Ruokangas et al. |
| 2004/0239550 A1 | 12/2004 | Daly, Jr. |
| 2005/0049789 A1 | 3/2005 | Kelly et al. |
| 2005/0174350 A1 | 8/2005 | Ridenour et al. |
| 2005/0222770 A1 * | 10/2005 | McKewon ............ G01S 13/951 702/3 |
| 2006/0036366 A1 | 2/2006 | Kelly et al. |
| 2007/0005249 A1 | 1/2007 | Dupree et al. |
| 2007/0152867 A1 | 7/2007 | Randall |
| 2008/0040038 A1 | 2/2008 | Southard et al. |
| 2008/0158049 A1 | 7/2008 | Southard et al. |
| 2008/0169967 A1 | 7/2008 | Wood et al. |
| 2008/0180282 A1 | 7/2008 | Brosius |
| 2009/0177343 A1 | 7/2009 | Bunch et al. |
| 2009/0219197 A1 | 9/2009 | Bunch |
| 2010/0019938 A1 | 1/2010 | Bunch |
| 2010/0019958 A1 | 1/2010 | Bunch et al. |
| 2010/0042275 A1 | 2/2010 | Kirk |
| 2010/0110431 A1 | 5/2010 | Ray et al. |
| 2010/0194628 A1 | 8/2010 | Christianson et al. |
| 2010/0201565 A1 | 8/2010 | Khatwa |
| 2010/0245164 A1 | 9/2010 | Kauffman |
| 2010/0245165 A1 | 9/2010 | Kauffman et al. |
| 2010/0302093 A1 | 12/2010 | Bunch et al. |
| 2010/0302094 A1 | 12/2010 | Bunch et al. |
| 2010/0315265 A1 | 12/2010 | Smith et al. |
| 2010/0328143 A1 | 12/2010 | Kirk |
| 2010/0332056 A1 | 12/2010 | Kirk |
| 2011/0074624 A1 | 3/2011 | Bunch |
| 2011/0148692 A1 | 6/2011 | Christianson |
| 2011/0148694 A1 | 6/2011 | Bunch et al. |
| 2012/0029786 A1 | 2/2012 | Calandra et al. |
| 2012/0086596 A1 | 4/2012 | Insanic et al. |
| 2012/0133551 A1 | 5/2012 | Pujol et al. |
| 2012/0139778 A1 | 6/2012 | Bunch et al. |
| 2013/0226452 A1 | 8/2013 | Watts |
| 2013/0234884 A1 | 9/2013 | Bunch et al. |
| 2013/0321442 A1 | 12/2013 | Van Os et al. |
| 2013/0345982 A1 * | 12/2013 | Liu .................. G01W 1/16 702/4 |
| 2014/0156133 A1 | 6/2014 | Cullinane et al. |
| 2014/0176362 A1 | 6/2014 | Sneed |
| 2014/0361923 A1 | 12/2014 | Bunch et al. |
| 2014/0362088 A1 | 12/2014 | Veillette et al. |
| 2015/0310747 A1 | 10/2015 | Frolik et al. |
| 2016/0180718 A1 | 6/2016 | Shapiro et al. |
| 2016/0266249 A1 | 9/2016 | Kauffman et al. |

FOREIGN PATENT DOCUMENTS

| | | |
|---|---|---|
| WO | WO-98/07047 A1 | 2/1998 |
| WO | WO-98/22834 A1 | 5/1998 |

(56) References Cited

FOREIGN PATENT DOCUMENTS

WO      WO-03/005060 A1      1/2003
WO      WO-2009/137158      11/2009

OTHER PUBLICATIONS

U.S. Appl. No. 14/162,035, filed Jan. 23, 2014, Kevin M. Kronfeld et al.
U.S. Appl. No. 14/323,766, filed Jul. 3, 2014, Weichbrod et al.
U.S. Appl. No. 14/465,730, filed Aug. 21, 2014, Breiholz et al.
U.S. Appl. No. 14/465,753, filed Aug. 21, 2014, Arlen E. Breiholz et al.
U.S. Appl. No. 14/608,071, filed Jan. 28, 2015, Breiholz et al.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, 2012, 19 pages.
Zipser, Edward J. et al., The Vertical Profile of Radar Reflectivity of Convective Cells: A Strong Indicator of Storm Intensity and Lightning Probability?, American Meteorological Society, Aug. 1994, 9 pages.
Final Office Action on U.S. Appl. No. 13/717,052, dated Nov. 13, 2015, 10 pages.
Final Office Action on U.S. Appl. No. 14/207,034, dated Oct. 13, 2016, 15 pages.
Non-Final Office Action on U.S. Appl. No. 14/162,035 dated Jul. 11, 2016, 10 pages.
Non-Final Office Action on U.S. Appl. No. 14/206,239 dated Jun. 16, 2016, 12 pages.
Non-Final Office Action on U.S. Appl. No. 14/206,651 dated Jun. 23, 2016, 12 pages.
Non-Final Office Action on U.S. Appl. No. 14/207,034 dated Jun. 23, 2016, 14 pages.
Non-Final Office Action on U.S. Appl. No. 14/323,766, dated Feb. 8, 2017, 21 pages.
Non-Final Office Action on U.S. Appl. No. 14/465,730, dated Oct. 21, 2016, 6 pages.
Non-Final Office Action on U.S. Appl. No. 14/608,071, dated Jan. 23, 2017, 15 pages.
Non-Final Office Action on U.S. Appl. No. 15/137,645 dated Aug. 8, 2016, 6 pages.
Notice of Allowance on U.S. Appl. No. 14/162,035, dated Nov. 9, 2016, 7 pages.
Notice of Allowance on U.S. Appl. No. 14/465,753, dated Aug. 29, 2016, 8 pages.
Notice of Allowance on U.S. Appl. No. 15/287,673, dated Nov. 18, 2016, 8 pages.
U.S. Appl. No. 12/075,103, filed Mar. 7, 2008, Woodell et al.
U.S. Appl. No. 13/246,769, filed Sep. 27, 20101, Rockwell Collins.
U.S. Appl. No. 13/717,052, filed Dec. 17, 2012, Woodell et al.
U.S. Appl. No. 13/837,538, filed Mar. 15, 2013, Kronfeld et al.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/206,239, filed Mar. 12, 2014, Rockwell Collins.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
3-D Weather Hazard and Avoidance System, Honeywell InteVue Brochure dated Nov. 2008, 4 pages.
Boudevillain et al., 2003, Assessment of Vertically Integrated Liquid (VIL) Water Content Radar Measurement, J. Atmos. Oceanic Technol., 20, 807-819.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.II.mit.edu/mission/aviation/faawxsystems/ciws.html, received on Aug. 19, 2009, 3 pages.
Decision on Appeal for Inter Parties Reexamination Control No. 95/001,860, dated Oct. 17, 2014, 17 pages.
Doviak et al., Doppler Radar and Weather Observations, 1984, 298 pages.
Dupree et al.,FAA Tactical Weather Forecasting in the United States National Airspace, Proceedings from the World Weather Research Symposium on Nowcasting and Very Short Term Forecasts, Toulouse, France, 2005, 29 pages.
Final Office Action on U.S. Appl. No. 12/892,663 dated Mar. 7, 2013, 13 pages.
Final Office Action on U.S. Appl. No. 13/238,606 dated Apr. 1, 2014, 11 pages.
Final Office Action on U.S. Appl. No. 13/238,606 dated Jan. 22, 2015, 6 pages.
Final Office Action on U.S. Appl. No. 13/246,769 dated Sep. 16, 2014, 18 pages.
Goodman et al., Lisdad Lightning Observations during the Feb. 22-23, 1998 Central Florida.
Greene et al., 1972, Vertically Integrated Water—A New Analysis Tool, Mon. Wea. Rev., 100, 548-552.
Hodanish, Integration of Lightning Detection Systems in a Modernized National Weather Service Office, http://www.srh.noaa.gov/mlb/hoepub.html, retrieved on Aug. 6, 2007, 5 pages.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pps.
Lahiff, 2005, Vertically Integrated Liquid Density and Its Associated Hail Size Range Across the Burlington, Vermont County Warning Area, Eastern Regional Technical Attachment, No. 05-01, 20 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Non-Final Office Action on U.S. Appl. No. 13/238,606 dated May 27, 2015, 14 pages.
Non-Final Office Action on U.S. Appl. No. 14/452,235 dated Apr. 23, 2015, 9 pages.
Non-Final Office Action on U.S. Appl. No. 14/681,901 dated Jun. 17, 2015, 21 pages.
Non-Final Office Action on U.S. Appl. No. 12/892,663 dated May 29, 2013, 14 pages.
Non-Final Office Action on U.S. Appl. No. 13/238,606 dated Jul. 8, 2014, 12 pages.
Non-Final Office Action on U.S. Appl. No. 13/238,606 dated Sep. 23, 2013, 15 pages.
Non-Final Office Action on U.S. Appl. No. 13/717,052 dated Feb. 11, 2015, 15 pages.
Non-Final Office Action on U.S. App. No. 13/717,052 dated Sep. 9, 2014, 8 pages.
Non-Final Office Action on U.S. Appl. No. 13/841,893 dated Jun. 22, 2015, 27 pages.
Non-Final Office Action on U.S. Appl. No. 13/913,100 dated May 4, 2015, 25 pages.
Non-Final Office Action on U.S. Appl. No. 13/919,406 dated Jul. 14, 2015, 23 pages.
Non-Final Office Action on U.S. Appl. No. 14/162,035, dated Feb. 4, 2016, 9 pages.

(56) References Cited

OTHER PUBLICATIONS

Non-Final Office Action on U.S. Appl. No. 14/465,753 dated Apr. 4, 2016, 12 pages.
Non-Final Office Action on U.S. Appl. No. 14/086,844, dated Nov. 10, 2015, 17 pages.
Notice of Allowance on U.S. Appl. No. 12/075,103 dated Aug. 4, 2014, 10 pages.
Notice of Allowance on U.S. Appl. No. 13/246,769 dated Jan. 8, 2015, 10 pages.
Notice of Allowance on U.S. Appl. No. 13/707,438 dated Feb. 25, 2015, 11 pages.
Notice of Allowance on U.S. Appl. No. 14/681,901, dated Dec. 23, 2015, 8 pages.
Office Action for U.S. Appl. No. 12/892,663, dated Oct. 22, 2012, 12 pages.
Office Action for U.S. Appl. No. 13/717,052, dated Aug. 22, 2013, 15 pages.
Office Action on U.S. Appl. No. 12/075,103 dated Jul. 31, 2013, 8 pages.
Office Action on U.S. Appl. No. 13/246,769 dated Apr. 21, 2014, 18 pages.
Pessi et al., On the Relationship Between Lightning and Convective Rainfall Over the Central Pacific Ocean, date unknown, 9 pages.
RDR-4B Honeywell User Manual for Forward Looking Windshear Detection/Weather Radar System, Rev. 6, Jul. 2003, 106 pps.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, paper presented on Oct. 16, 2005, 10 pages.
Corrected Notice of Allowance for U.S. Appl. No. 14/608,071 dated Dec. 15, 2017. 3 pages.
Notice of Allowance for U.S. Appl. No. 14/323,766 dated Jun. 19, 2017. 7 pages.
Notice of Allowance on U.S. Appl. No. 14/465,730, dated Feb. 28, 2017, 5 pages.
Notice of Allowance on U.S. Appl. No. 14/608,071, dated Aug. 31, 2017, 9 pages.

* cited by examiner

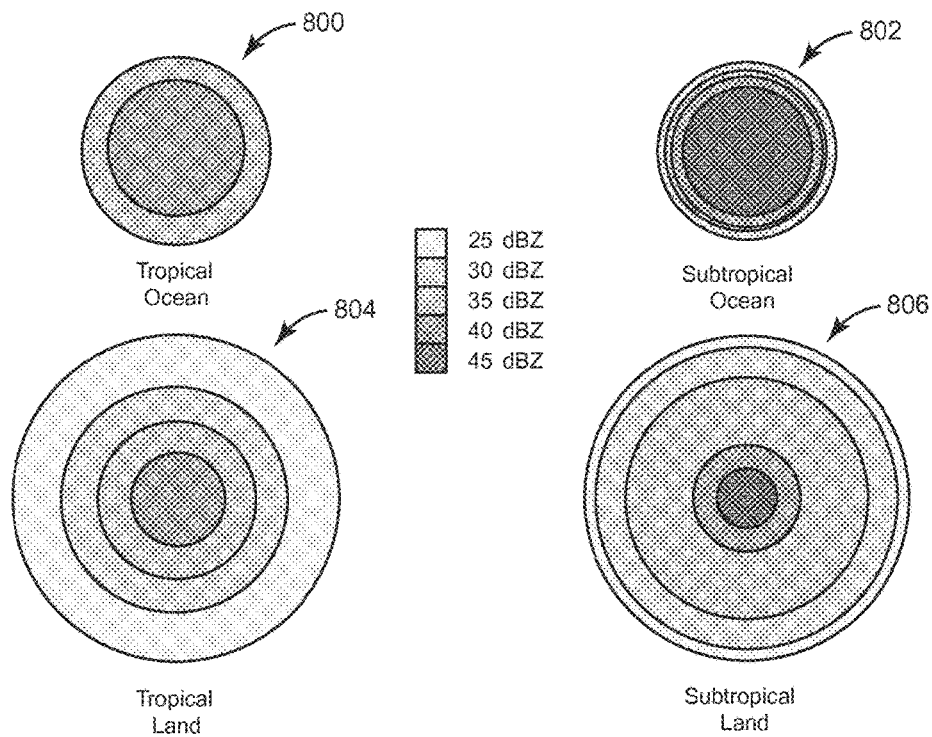
FIG. 8
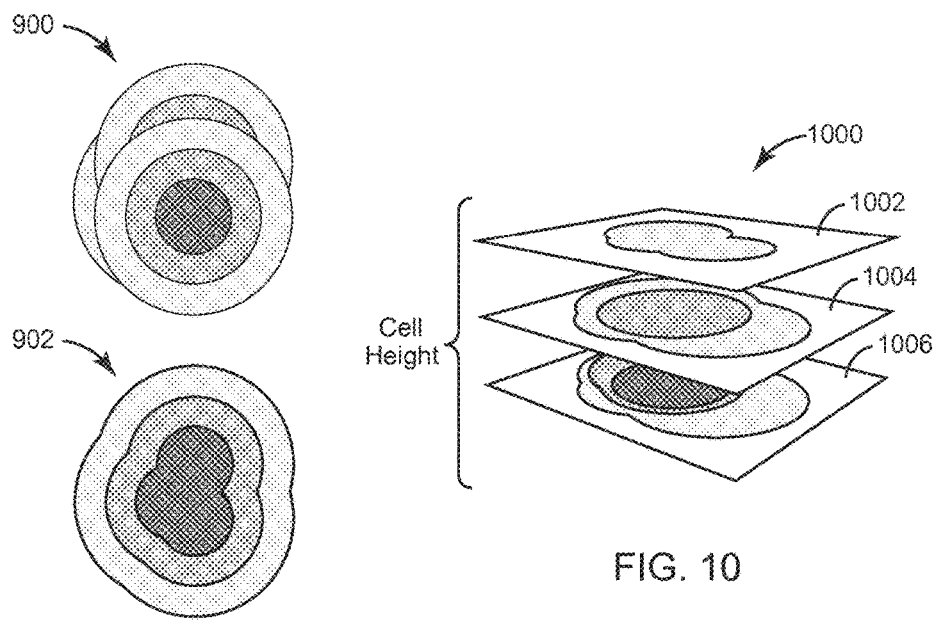
FIG. 9
FIG. 10

SYSTEM AND METHOD OF INTEGRATING GLOBAL CONVECTIVE WEATHER

CROSS-REFERENCE TO RELATED APPLICATIONS

The present application is related to U.S. patent application Ser. No. 14/465,753 filed on Aug. 21, 2014 by Breiholz et al., entitled "Weather Radar System and Method With Fusion of Multiple Weather Information Sources," to U.S. patent application Ser. No. 14/162,035 filed on Jan. 23, 2014 by Kronfeld et al., entitled "Weather Radar System and Method With Path Attenuation Shadowing," to U.S. patent application Ser. No. 14/086,844 filed on Nov. 21, 2013 by Breiholz et al., entitled "Weather Radar System and Method for Estimating Vertically Integrated Liquid Content," to U.S. patent application Ser. No. 14/465,730 filed on Aug. 21, 2014 by Breiholz et al., entitled "Weather Radar System and Method With Latency Compensation for Data Link Weather Information," to U.S. patent application Ser. No. 14/323,766 filed on Jul. 3, 2014 by Shimon et al., entitled "Efficient Retrieval of Aviation Data and Weather Over Low Bandwidth Links," and to U.S. patent application Ser. No. 14/608,071 filed on Jan. 28, 2015 by Breiholz et al., entitled "Enhancement of Airborne Weather Radar Performance Using External Weather Data," each of which is assigned to the assignee of the present application and incorporated herein by reference in its entirety.

BACKGROUND

The inventive concepts disclosed herein relate generally to the field of weather display systems, and more particularly to weather display systems and methods configured to provide multiple source weather data.

Aircraft weather radar systems are often used to alert operators of vehicles, such as aircraft pilots, of weather hazards in the area near the aircraft. Such weather radar systems typically include an antenna, a receiver transmitter, a processor, and a display. The system transmits radar pulses or beams and receives radar return signals indicative of weather conditions. Conventional weather radar systems, such as the WXR 2100 MULTISCAN radar system manufactured by Rockwell Collins, Inc., have Doppler capabilities and can measure or detect parameters such as weather range, weather reflectivity, weather velocity, and weather spectral width or velocity variation. Weather radar systems may also detect outside air temperature, winds at altitude, INS G loads (in-situ turbulence), barometric pressure, humidity, etc.

Weather radar signals are processed to provide graphical images to a radar display. The radar display is typically a color display providing graphical images in color to represent the severity of the weather. Some aircraft systems also include other hazard warning systems such as a turbulence detection system. The turbulence detection system can provide indications of the presence of turbulence or other hazards. Conventional weather display systems are configured to display weather data in two dimensions and often operate according to ARINC 453 and 708 standards. A horizontal plan view provides an overview of weather patterns that may affect an aircraft mapped onto a horizontal plane. Generally the horizontal plan view provides images of weather conditions in the vicinity of the aircraft, such as indications of precipitation rates. Red, yellow, and green colors are typically used to symbolize areas of respective precipitation rates, and black color symbolizes areas of very little or no precipitation. Each color is associated with radar reflectivity range which corresponds to a respective precipitation rate range. Red indicates the highest rates of precipitation while green represents the lowest (non-zero) rates of precipitation. Certain displays may also utilize a magenta color to indicate regions of turbulence.

While aircraft-based weather radar systems may typically provide the most timely and directly relevant weather information to the aircraft crew based on scan time of a few seconds, the performance of aircraft-based weather systems may be limited in several ways. First, typical radar beam widths of aircraft-based weather radar systems are 3 to 10 degrees. Additionally, the range of aircraft-based weather radar systems is typically limited to about 300 nautical miles, and typically most effective within about 80-100 nautical miles. Further, aircraft-based weather radar systems may be subject to ground clutter when the radar beam intersects with terrain, or to path attenuation due to intense precipitation or rainfall.

Information provided by aircraft weather radar systems may be used in conjunction with weather information from other aircraft or ground-based systems to, for example, improve range and accuracy and to reduce gaps in radar coverage. For example, the National Weather Service WSR-88D Next Generation Radar (NEXRAD) weather radar system is conventionally used for detection and warning of severe weather conditions in the United States. NEXRAD data is typically more complete than data from aircraft-based weather radar systems due to its use of volume scans of up to 14 different elevation angles with a one degree beam width. Similarly, the National Lightning Detection Network (NLDN) may typically be a reliable source of information for weather conditions exhibiting intense convection. Weather satellite systems, such as the Geostationary Operational Environmental Satellite system (GOES) and Polar Operational Environmental Satellite system (POES) are other sources of data used for weather analyses and forecasts.

Current global convective information does not identify thunderstorm cores, overestimates the extent of thunderstorms, includes very little storm height information, results in poor predictions, is generally not very timely, and is difficult to interpret. Global convective weather information is conventionally derived from multiple sources. The first source is infrared satellite information that is 15 minutes to 1 hour old and only provides a coarse area where the highest clouds are located and not necessarily where the convective cells are located. The second source is global forecast models, which are used to identify and predict locations of convective activity using dew point and temperature information among other variables. The products derived from Global Forecast Models are very coarse and do not accurately identify the thunderstorm cores or the extent of the thunderstorm. Global lightning information is also available, but only shows the location of the strongest flashes and not the full extent of a thunderstorm core or whether the lightning flash is from a thunderstorm core or a non-threatening dissipating stratiform area. Existing products may derive a surrogate 2-D reflectivity or threat level from a lightning flash rate, however, such products are limited in usage in the United States and not globally. Moreover, global convective products are difficult to interpret by the operator, because the color codes do not correspond to threat levels pilots are accustomed to.

SUMMARY

In one aspect, the inventive concepts disclosed herein are directed to a method of providing convective weather data.

The method includes accessing lightning data, accessing statistical data representing a relationship between lightning flash rate data and at least one of reflectivity data and weather threat data, and accessing at least one of time of year data, geographic location data, temperature data, and altitude data. The method also includes generating a weather threat level map based on the accessed lightning data, the accessed statistical data, and the at least one of time of year data, geographic location data, temperature data, and altitude data. The weather threat level map indicates at least one of reflectivity and a weather threat. The method also includes providing the weather threat level map to an output port.

In a further aspect, the inventive concepts disclosed herein are directed to a weather processing device including a processor and an output port coupled to the at least one processor. The processor is configured to access lightning data, access statistical data representing a relationship between lightning flash rate data and at least one of reflectivity data and weather threat data, and access at least one of time of year data, geographic location data, temperature data, and altitude data. The processor is also configured to generate a weather threat level map based on the accessed lightning data, the accessed statistical data, and the at least one of time of year data, geographic location data, temperature data, and altitude data. The weather threat level map indicates at least one of reflectivity and a weather threat. The weather processing device also includes an output port coupled with the at least one processor and configured to provide the weather threat level map to at least one of a display, a weather avoidance decision support system, and an automated weather avoidance or rerouting system.

In a further aspect, the inventive concepts disclosed herein are directed to a weather processing system includes at least one processor and an output port coupled to the at least one processor. The processor is configured to access lightning data, access statistical data representing a relationship between lightning flash rate data and at least one of reflectivity data and weather threat data, access at least one of time of year data, geographic location data, temperature data, and altitude data, and access satellite data indicating convective activity. The processor is also configured to generate a weather threat level map based on the accessed lightning data, the accessed statistical data, the at least one of time of year data, geographic location data, temperature data, and altitude data, and the satellite data. The weather threat level map indicates at least one of reflectivity and a weather threat. The weather processing system also includes an output port coupled with the at least one processor and configured to provide the weather threat level map to at least one of a display, a weather avoidance decision support system, and an automated weather avoidance or rerouting system.

BRIEF DESCRIPTION OF THE DRAWINGS

Embodiments of the inventive concepts disclosed herein will become more fully understood from the following detailed description, taken in conjunction with the accompanying drawings, wherein like reference numerals refer to like elements, in which:

FIG. 8 is a schematic diagram illustrating the relationship between reflectivity and geographical region as may be used by the convective weather system of FIG. 3;

FIG. 9 is a schematic diagram illustrating an exemplary embodiment of weather threat level maps that may be produced by the convective weather system of FIG. 3;

FIG. 10 is a schematic diagram illustrating an exemplary embodiment of a vertical weather threat level map that may be produced by the convective weather system of FIG. 3;

DETAILED DESCRIPTION OF THE EXEMPLARY EMBODIMENTS

Figure 1A:
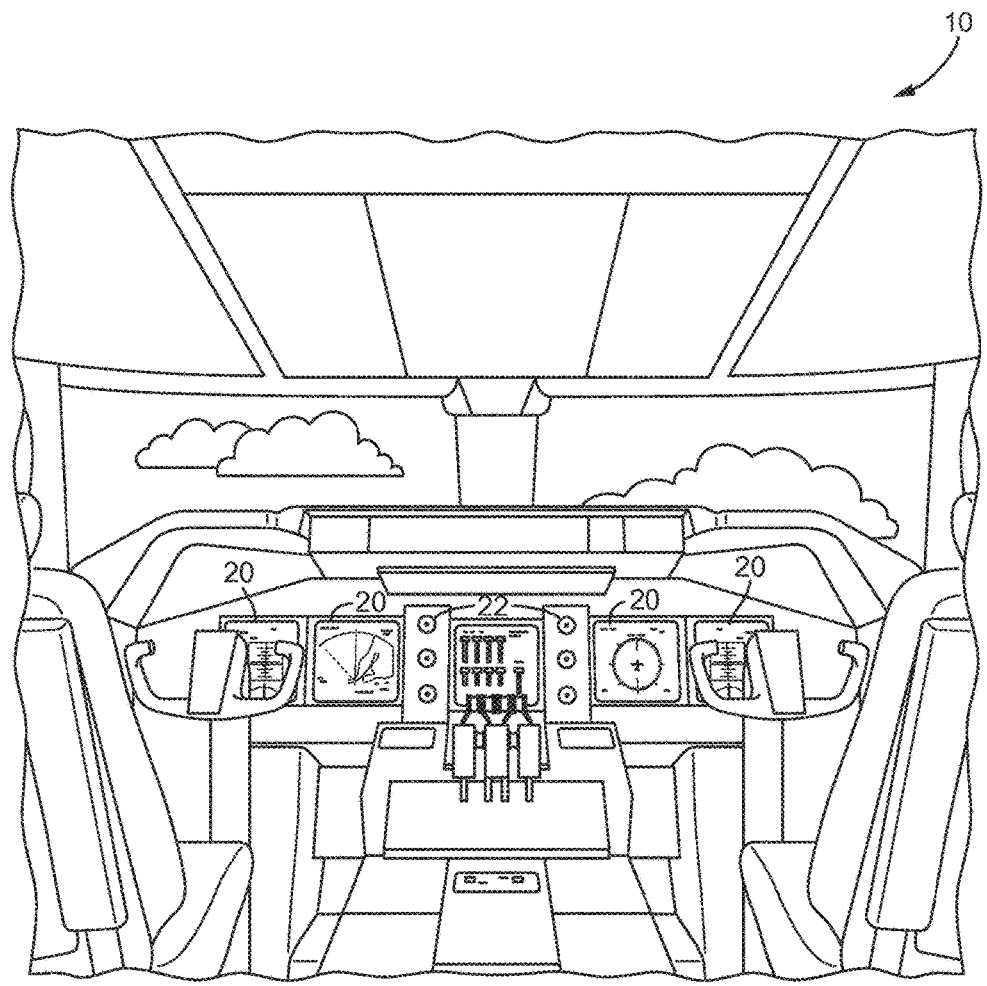
FIG. 1A is a schematic diagram of an aircraft control center or cockpit according to an exemplary embodiment of the inventive concepts disclosed herein.

Before turning to the figures, which illustrate exemplary embodiments of the inventive concepts disclosed herein in detail, it should be understood that the inventive concepts disclosed herein are not limited to the details or methodology set forth in the description or illustrated in the figures. It should also be understood that the terminology is for the purpose of description only and should not be regarded as limiting. As discussed below, systems and methods according to the inventive concepts disclosed herein can be utilized in a number of display devices for various types of applications or sensing systems. In some embodiments, the systems and methods of the inventive concepts disclosed herein may be used for a flight display of an aircraft. According to various exemplary embodiments, the systems and methods according to the inventive concepts disclosed herein may be used by any system in any embodiment that uses weather data or that renders computer graphics and displays an output (e.g., in another aircraft or spacecraft, a ground-based vehicle, a handheld device, in a non-vehicle application such as a ground-based weather radar system, a weather observation system, a situation awareness system, or a weather avoidance system).

A ground based system or an aircraft hazard warning system or other avionic system may integrate or combine convective weather data for displaying threat levels of the weather data on a display in one embodiment. The system can provide indications of convective threat levels using multiple sources including global lightning data, global weather model information, and satellite data for convective weather observation, prediction situation awareness, and weather threat avoidance in one embodiment. The system identifies convective weather cores using high update rate global lightning information to create a lightning flash rate map, where each flash over a predetermined interval (e.g., 10 minutes) is mapped to a memory map where each flash has an area of influence (e.g., 8 km) in one embodiment. The system uses weather model statistics (e.g., the Rockwell Collins global Tropical Rainfall Measurement Mission (TRMM) statistics) to identify 3-D global relationships between lightning flash rate and reflectivity or weather threat in one embodiment. The system considers time of year, geographic location, and temperature/altitude to select the appropriate flash rate to reflectivity function for reflectivity data in one embodiment. A weather threat level map or lightning flash rate map may be created, and successive maps can be compared using a trending and tracking algorithm to derive motion information that can be used for latency compensation and short-term predictions/nowcasts in one embodiment. In one embodiment, weather model statistics can be used to establish relationships between satellite infrared and visible channels and reflectivity and weather threat information.

Satellite information is typically between 15 minutes to 1 hour old based on regional satellite capabilities and therefore the location data of weather represented in the satellite information is generally relative to the current time. To compensate for this, the latent satellite data can be combined with wind information (e.g., 500 mb forcing level wind information) from meteorological model such as the Global Forecast System (GFS) to compensate for the age of satellite data in one embodiment. For example, the wind field may be combined with the infrared satellite data grid and each satellite grid value may be extrapolated to a predicted location based on the wind motion vector. The infrared satellite data indicates overall convective activity, but not necessarily where the convective cores are located. Combining the satellite with the estimated reflectivity/threat allows for a viable mid to long range convective threat assessment system, particularly if used in conjunction with an airborne weather radar according to some embodiments. The reflectivity threat information can also be turned into weather objects for use in weather avoidance decision support tools and automated weather avoidance or re-routing systems in some embodiments. Statistical information derived from the TRMM satellite or similar satellite may be used to derive an importance of each weather source in an overall weight or contribution in the weather threat level map.

Referring to FIG. 1A, an exemplary aircraft control center or cockpit 10 for an aircraft is shown. The aircraft control center 10 may include one or more flight displays 20. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, etc. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. Other types and functions for the flight displays 20 are contemplated as well. According to an exemplary embodiment, at least one of the flight displays 20 may be configured to provide a rendered display from the systems and methods of the present disclosure. In an exemplary embodiment, the rendered display from the systems and methods herein may be provided by a display at a terrestrial or ground station (e.g., a ground weather station or an aircraft dispatch location) or on a handheld device.

In some embodiments, the flight displays 20 may provide an output from an aircraft-based weather radar system, LIDAR system, infrared system or other system on the aircraft. For example, the flight displays 20 may include a weather display, a multifunction display, a weather radar map and a terrain display. Further, the flight displays 20 may include an electronic display of a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain above sea level or the altitude relative to the aircraft.

The aircraft control center 10 may include one or more user interface (UI) elements 22. The UI elements 22 may include, for example, dials, switches, buttons, touch screens, keyboards, a mouse, joysticks, cursor control devices (CCDs) or other multi-function key pads certified for use with avionics systems, etc. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an occupant to interface with or change the displays of the flight displays 20. The UI elements 22 may additionally be used to acknowledge or dismiss an indicator provided by the flight displays 20. Further, the UI elements 22 may be used to correct errors on the electronic display. Other UI elements 22, such as indicator lights, displays, display elements, and audio alerting devices, may be configured to warn of potentially threatening conditions such as severe weather, terrain, obstacles, etc.

Figure 1B:
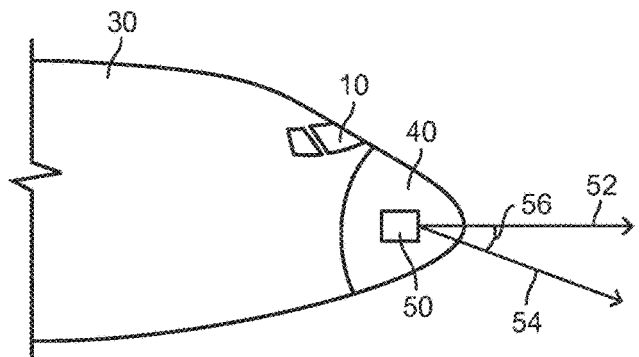
FIG. 1B is a schematic view of an aircraft having a weather radar system according to an exemplary embodiment of the inventive concepts disclosed herein.

Referring to FIG. 1B, a side-view of an exemplary aircraft 30 with aircraft control center 10 and a nose 40 is shown. In the illustrated embodiment, a radar system 50, such as a weather radar system or other radar system, is generally located inside nose 40 of aircraft 30 or inside a cockpit of aircraft 30. According to some exemplary embodiments, the radar system 50 may be located anywhere on the aircraft 30, such as on the top of the aircraft 30 or on the tail of the aircraft 30. Further, the various components of the radar system 50 may be distributed at multiple locations throughout aircraft 30. Additionally, the radar system 50 may include or be coupled to an antenna system of the aircraft 30. The radar system 50 or other equipment aboard the aircraft 30 may also be configured to receive or access weather data from other sources. The radar system 50 may be configured to detect or access data for the systems and methods of the present disclosure. According to exemplary embodiments, the radar system 50 may be an RTA-4218 MULTISCAN radar system, a WXR-2100 MULTISCAN radar system, or similar system manufactured by Rockwell Collins Inc., and configured in accordance with the principles described herein.

The radar system 50 may generally work by sweeping or casting a radar beam horizontally back and forth across the sky. For example, the radar system 50 may conduct a first horizontal sweep 52 directly in front of the aircraft 30 and a second horizontal sweep 54 downward at a tilt angle 56 (e.g., 20 degrees down). Returns from different tilt angles may be electronically merged to form a composite image for display on an electronic display, such as the flight display 20 in the aircraft control center 10. Returns may also be processed to, for example, distinguish among terrain, weather, and other objects, to determine the height of the terrain, or to determine the height of the weather.

The radar system 50 may also sweep a radar beam vertically back and forth at varying vertical tilt angles. Results from the different vertical tilt angles may be analyzed to determine the characteristics of weather. For example, the altitude, range, and vertical height of weather may be determined using the vertical scan results. The vertical scan results may be used to form an image for display on an electronic display (e.g., the flight display 20). For example, a vertical profile view of the weather may be generated. The profile may be used by a pilot to determine height, range, hazards and threats, and other relevant information that may be utilized by an aircraft crew member to change the course of the aircraft to avoid the detected weather condition.

Figure 2A:
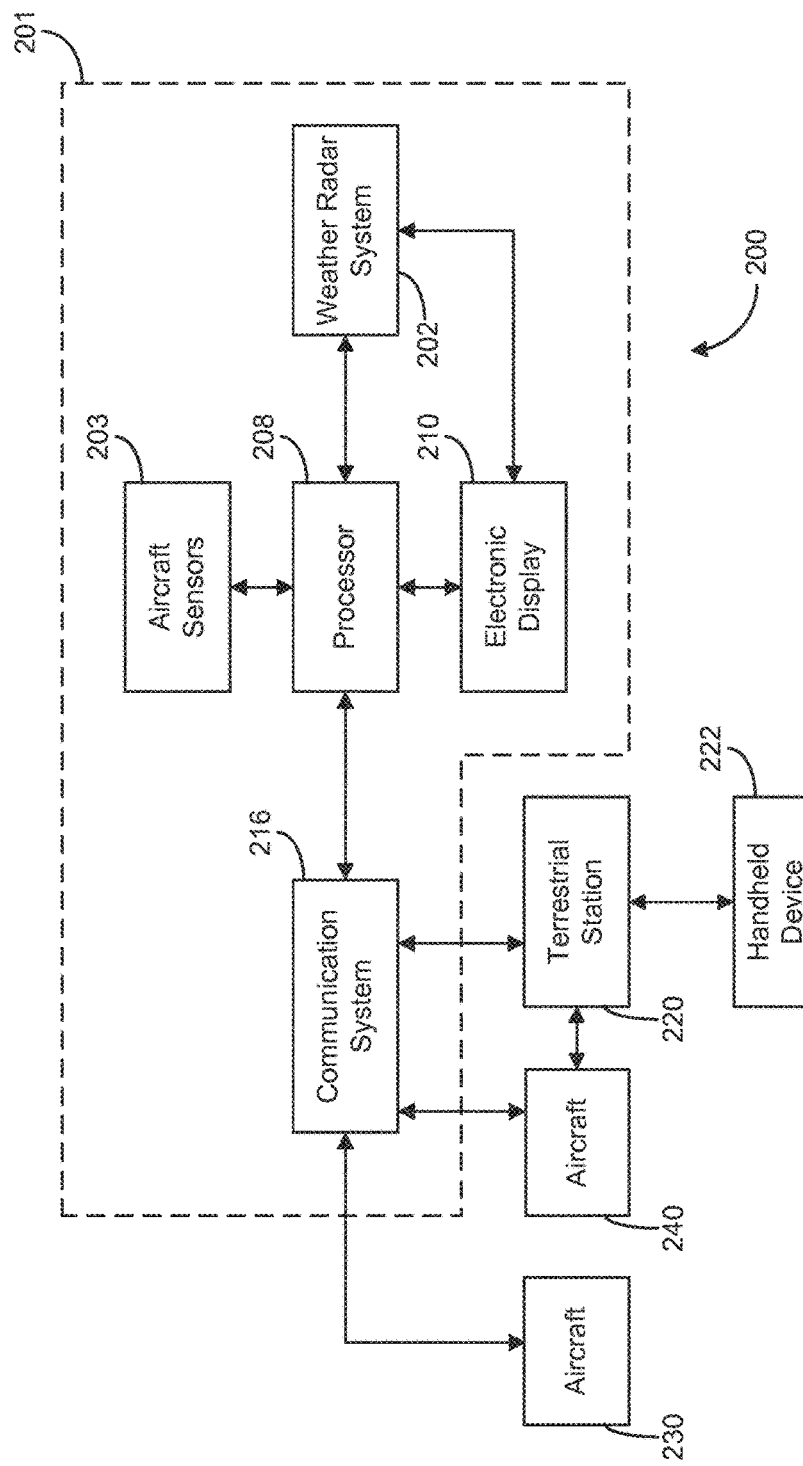
FIG. 2A is a block diagram of a hazard warning system according to an exemplary embodiment of the inventive concepts disclosed herein.

Referring to FIG. 2A, a block diagram is shown of an exemplary weather detection system 200 that may be used, for example, on or with an aircraft 201 or other vehicle. The system 200 may include a weather radar system 202 (e.g., a system similar to the radar system 50), aircraft sensors 203, electronics (such as a processor 208), an electronic display system 210 (e.g., a display similar to the flight display 20), and a communication system 216. The weather radar system 202 is generally configured to sweep or cast one or more radar beams from an aircraft mounted antenna, to receive returns, and to interpret the returns (e.g. for display to a user, for transmission to an external weather system).

Additionally, the weather radar system 202 may perform multiple radar sweeps. The radar sweeps may include horizontal sweeps, vertical sweeps, or a combination of horizontal and vertical sweeps. Further, the radar sweeps can be performed such that they are substantially orthogonal to one another. According to some exemplary embodiments, the weather radar system 202 can be a monopulse radar system, a sequential lobing system, or a radar system with an aperture capable of switching modes. The weather radar system 202 may be a system for detecting weather patterns. Detected weather patterns may be communicated to the electronic display system 210 for display to the flight crew. In addition, data from the station 220 may be displayed on the display system 210. Detected weather patterns may instead or may also be provided to electronics or the processor 208 for further analysis or transmission to a station 220 or another aircraft 230, 240 via communication system 216. Communication system 216 may also receive weather radar data from other aircraft 230,240 or from the terrestrial station 220.

The aircraft sensors 203 may include, for example, one or more lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, or any other aircraft sensors or sensing systems that may be used to monitor weather and detect, for example, lightning, convective cells, or clear air turbulence. Data from the aircraft sensors 203 may be output to the processor 208 for further processing and display, or for transmission to a station 220 (e.g., a ground-based weather radar system or terrestrial station), to other aircraft 230, 240, or to a handheld device 222 (e.g., a laptop, a tablet, a smartphone, or any other portable computing device) via the communication system 216. The communications system 216 may be any wired (e.g., USB, parallel, serial, coaxial, fiber optic) and/or wireless (e.g., Bluetooth, WiFi, Zigbee, mesh, cellular, RF) communication system.

The station 220 may direct the aircraft 201, 230, 240 via the communication system 216 to scan in specific areas to improve detection accuracy of weather. Alternatively, the system 202 may request that the station 220 and the aircraft 230, 240 direct a scan towards weather of interest to the aircraft 201 (e.g., in the flight path) to improve weather detection accuracy. The scans performed by the radar system 202 and the requests may be transmitted to the station 220 or another aircraft 230, 240 via the communication system 216.

In some embodiments, the station 220 or the processor 208 may produce global convective weather information. For example, the station 220 may access or receive global lightning data from a network of lightning sensors, global weather model data, and satellite data. The station 220 may combine the data to produce a convective weather observation (e.g., a weather threat level map), as described in greater detail below, which can be used to predict situation awareness or for weather threat avoidance. In some embodiments, the station 220 may also access radar data from the aircraft 201, 230, 240 to assist in producing the convective weather observation. The station 220 can output the convective weather observation to the aircraft 201 via the communication system 216, to the handheld device 222 via the communication system 216 or via a direct connection (e.g., a USB connection or other wired connection; a Bluetooth, WiFi, or other wireless connection), or to the aircraft 230, 240 via the communication system 216 or via a direct connection. The display 210, a display on the handheld device 222, or a display on the aircraft 2304, 240 may display the convective weather observation. In some embodiments, the processor 208 may perform the steps described above with reference to the station 220.

Figure 2B:
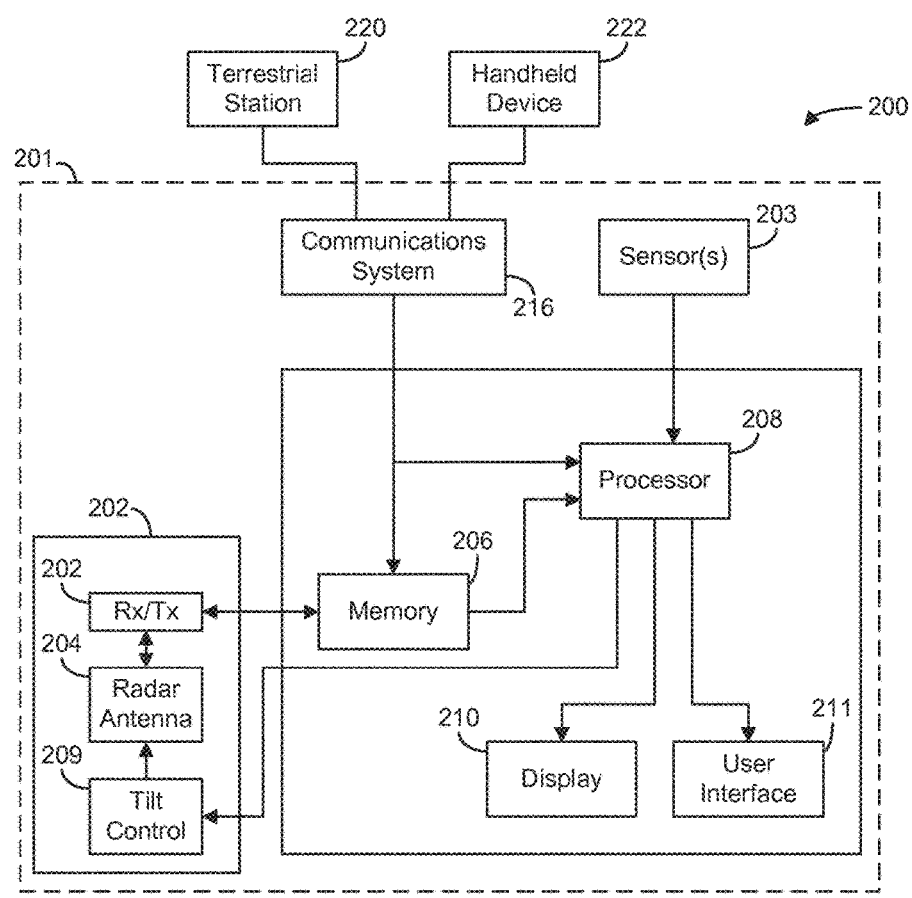
FIG. 2B is a block diagram of a hazard warning system according to an exemplary embodiment of the inventive concepts disclosed herein.

Referring to FIG. 2B, an exemplary weather radar system used by an aircraft 201 is shown. The aircraft 201 includes a weather radar receiver/transmitter 226, a weather radar adjustable antenna 204, a memory 206 (e.g., a multi-scan, multi-tilt angle memory), a processor 208 and a system bus that couples various system components including the memory 206 to the processor 208. The aircraft 201 also includes a tilt control 229 for automatically controlling the tilt angle (mechanical or electronic) of the weather data adjustable antenna 204. In some embodiments, this auto control may include an additional manual control feature as well. The aircraft 201 also includes one or more displays 210 (e.g., a display similar to the flight display 20 shown in FIG. 1), one or more UI elements 211 (e.g., similar to the UI elements 22 shown in FIG. 1), and one or more sensors 203. The aircraft 201 is also in communication with one or more remote terrestrial stations 220 and a hand held device 222 via a communications system 216. The terrestrial stations 220 may be in communications with one or more data sources, such as another aircraft, a detection network (e.g., lightning detection network, radar detection network), a weather model or statistical database, etc. In some embodiments, the hand held device 222 may be in communication with the terrestrial station 220.

Figure 3:
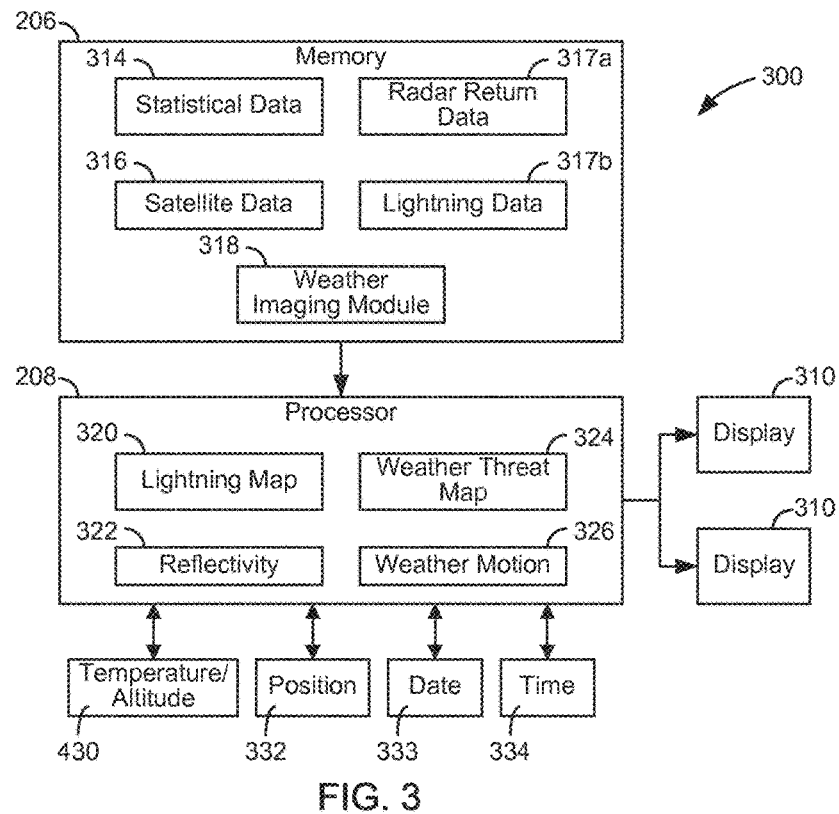
FIG. 3 is a block diagram of a convective weather system according to an exemplary embodiment of the inventive concepts disclosed herein.

The memory 206 may include any type of machine-readable storage device capable of storing radar returns, lightning data, satellite data, convective weather data, weather threat data, or associated weather data (shown in FIG. 3) or program instructions for analysis/processing by the processor 208, such as weather imaging module or application 318 (shown in FIG. 3). The memory 206 may be, for example, a non-transitory machine-readable medium for carrying or having machine-executable instructions or data structures stored thereon. Such machine-readable media may be any available media that may be accessed by a general purpose or special purpose computer or other machine with a processor. By way of example, such machine-readable media may comprise random access memory (RAM), read only memory (ROM), erasable programmable read only memory (EPROM), electrically erasable programmable memory (EEPROM), CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine. The aircraft 201 may have one or more memories 206 that use the same or a different memory technology. In some embodiments, the terrestrial station 220 may include one or more of the memories 206. The memory 206 may store weather data and weather imaging applications in addition to other instructions or data.

The processor 208 may be implemented in hardware, firmware, software, or any combination of these methods. While a single processor 208 is shown in the Figures, in some embodiments, the processor 208 may include multiple processors that are located locally or remotely from the rest of the system. The aircraft 201 or the terrestrial station 220 may have one or more processors 208 that use the same or a different processing technology. Additionally, the processor 208 may be a separate component of the aircraft 201, the terrestrial station 220, or the handheld device 222 or may be embedded within another component of the aircraft 201, the terrestrial station 220, or the handheld device 222. The processor 408 may execute instructions that may be written using one or more programming languages, scripting languages, assembly languages, etc. The instructions may be carried out by, for example, a special purpose computer, logic circuits, or hardware circuits. The term "execute" is the process of running an application or the carrying out of the operation called for by an instruction. The processor 208 may process data and/or execute applications stored in the memory 206, such as the weather data and weather image application and/or other instructions.

The processor 208 may be included as part of a multi-scan, multi-tilt angle weather radar system and may perform the customary functions performed by a conventional weather radar return processing unit. The processor 208 may also perform several additional operations based upon the additional data and/or instructions provided in the memory 206, such as the convective weather methodology described herein. In general, the processor 208 may access data from various sources and integrate or combine them to generate convective weather observations and predictions in the form of data or weather threat level maps. The term "access," as used herein, is understood to mean any type of data receipt or acquisition. For example, processor 208 may receive data pushed to it from other sources or may retrieve, poll, or pull data from a memory, a from communications system, or from other sources. The processor 208 may also merge or cross qualify portions, or ranges, of the radar returns of several different antenna sweeps at several different tilt angles, so that a single, relatively clutter-free image may be presented to the pilot based upon the several separate scans. The radar returns may be processed by the processor 208 to generate a 2-D, 3-D, or 4-D weather profile of the weather near the aircraft 201. In some embodiments, the processor 208 may merge or cross qualify portions, or ranges, of the radar returns or weather data of several different sources, including weather data from one or more remote sources via the terrestrial station 220 or the communications system 216, so that a composite or fused image may be presented to the pilot based upon the several weather data sources.

The processor 208 may process weather radar returns to identify or sense the presence of weather conditions in front of (e.g., in the flight path), in view of, or in proximity to the aircraft. In some embodiments, the processor 208 may utilize the altitude and range of the weather condition to generate a vertical profile associated with the weather. The processor 208 may scan across an array of azimuths to generate a 3-D weather profile of the weather near the aircraft, which may be stored for later presentation and/or displayed on the display 210 or a display of the handheld device 222. In some embodiments, additional visual indicators other than the representation of weather are provided on the display 210 or a display of the handheld device 222. In some embodiments, a range and bearing matrix having range markers indicating distance from a current location of the aircraft 201 and bearing markers indicating azimuths from a current flight path or bearing of the aircraft may be provided and may assist the pilot in cognitive recognition of weather features from the pilot's perspective.

Referring now to FIG. 3, a data flow diagram of an exemplary global convective weather system 300 is shown. The system 300 may be located on the terrestrial station 220, onboard the aircraft 201, or on the handheld device 222. As shown in FIG. 3, a processor 208 may provide a lightning flash map 320, reflectivity data 322 (e.g., a map or data array), a weather threat level map 324, and weather motion data 326 (e.g., a map or data array). The processor 208 may also access a temperature/altitude parameter 330, a position or location parameter 332, a date or time of year parameter 333, and a time parameter 334 from another external sensor or system. In some embodiments, the parameters 330, 332, 333, and 334 may be computed by the processor 208 using data stored in a memory 206, such as weather model or statistical data 314, satellite data 316, radar return data 317a or lightning data 317b.

The processor 208 generates the lightning flash map 320 based at least on statistical data 314 and lightning data 317b. Statistical data 314 provides a correlation of expected reflectivity for a given flash rate. The lightning flash map 320 may also be based on parameters 330, 332, 333, and 334 to determine a precise statistical correlation based on an expected temperature at a given altitude, based on a time of year and/or time of day, and based on a location. The lightning flash map 320 is configured to indicate a standard reflectivity color scheme through coloring, texturing, or associated data. In some embodiments, the processor 208 may store generated lightning flash maps 320 in the memory 206 for later reference or to derive motion for forecasting future lightning flash maps 320. Each lightning flash map 320 may be stored in memory as an image (e.g., color, grayscale, textured monochrome) or as data representative of an image.

In some embodiments, processor 208 may estimate reflectivity based on satellite data using statistical relationships between TRMM satellite radar and infrared or visible satellite features (including satellite trend data). Statistical data 314 may include statistics of a satellite related to the geographic location, time of year, time of day, temperature/altitudes parameters 330, 332, 333, 334. Processor 208 may access the statistical data 314 to derive reflectivity or threat information from the satellite statistics.

In some embodiments, the processor 208 may generate the weather threat map 324 based on the generated lightning flash map 320 and satellite data 316. The weather threat map 324 is configured to have a standard reflectivity color scheme including green, yellow, red, and optionally magenta. The weather threat map 324 may be provided to display 210 or a display of handheld device 222 via an output port for viewing by a pilot. Alternatively, the weather threat map 324 may be provided to a weather threat avoidance or re-routing system of the aircraft 201 via an output port. In some embodiments, the processor 208 may be further refined using weather data 317a. In some embodiments, satellite data 316 may be adjusted based on wind information and an expected latency in accessing the satellite data. Further details of the methodology behind the system 300 are provided below.

In some embodiments, the weather threat map 324 may be the lightning flash map 320 or the processor 208 may generate the weather threat map 324 based on the lightning flash map 320. In some embodiments, the weather threat map 324 may be omitted and the lightning flash map 320 may be provided by the system 300.

The data stored in the memory 206 may be data accessed from local or external sources. In one embodiment where the system 300 is on the aircraft 201, statistical data 314, satellite data 316, and lightning data 317b may be received from the terrestrial station 220 or the handheld device 222 via the communication system 216. Weather data 317a from returns received by the antenna 204 may be stored in the memory 206. Weather data 317a may, for example, be based on received horizontal and/or vertical radar scans. Weather data 317a may also be from another weather radar source or data from an onboard weather radar system operating at a different frequency, such as a Ka band frequency, a W band frequency, etc. Weather data 317a may be accessed via the communications unit 216 and/or from the terrestrial station 220 (e.g., NEXRAD weather data). In some embodiments, weather data 317a may be from a non-radar airborne source (a LIDAR source, an infrared source, etc.). Weather data 317a may include, for example, a time of sensing data, such as a time stamp, and motion vector data (e.g., individual weather cell and average motion vector data) for temporal and spatial correlation (e.g., NEXRAD data accessed from the terrestrial station 220).

In some embodiments where the system 300 is on the terrestrial station 220 or the handheld device 222, statistical data 314 may be preloaded from a statistical model (e.g., the TRMM model mentioned above, or another statistical weather model correlating lightning data to reflectivity or convective weather), satellite data 316 may be accessed from the NEXRAD system or another IR satellite data source, and lightning data 317b may be accessed from a global lightning network (e.g., the National Lightning Detection Network (NLDN) available from Vaisala, the World Wide Lightning Location Network (WWLLN) administered by the University of Washington and various other universities, Earth Networks Total Lightning Network (ENTLN) available from Earth Networks). Weather data 317a may be accessed via the communications unit 216 and/or from the aircraft 201, 230, 240, from a ground based radar system, or from a non-radar airborne source (a LIDAR source, an infrared source, etc.). In some embodiments, radar return data 317a may not be located in the memory 206, but the processor 208 may receive the data directly from the antenna or an external system via the communications system 216. Parameters 320, 322, 324, and 326 may be provided to the aircraft 201, which may optionally combine the data with the radar return data. In embodiments where the system 300 is on the terrestrial station 220, the provided weather threat map 324 and future updates to the weather threat map 324 may be provided to the aircraft 201 or the handheld device 222 at a predetermined interval. For example, an updated weather threat map 324 may be provided to the aircraft 201 or the handheld device 222 every minute, every 5 minutes, every 10 minutes, or at any other time interval depending on the bandwidth of the communications system 216.

Referring again to FIG. 2B, the memory 206 may store a weather imaging module 318 that may be executed by the processor 208. The weather imaging module 318 may be, for example, one or more program modules including routines, programs, objects, components, data structures, etc. that perform particular tasks or implement particular data types. The weather imaging module 318 may be written using, for example, one or more programming languages, assembly languages, scripting languages, etc. According to an exemplary embodiment, the weather imaging module 318 may be an organized set of instructions that, when executed, cause the processor 208 to utilize weather data 317a from returns received by the antenna 204 and/or from a remote source stored in the memory 206 to provide individual, composite, fused, or overlay image data indicative of a weather condition for display on the display 210 or a display of the handheld device 222. The image data derived from weather data 317a and remote sources may be spatially correlated by the weather imaging module 318 using, for example, time of sensing information and motion vector values. In some embodiments, growth and decay information may be accessed, which may be used by the weather imaging module 318 to increase or decrease the size, shape, and intensity of an image or other visual indication of a weather condition displayed in accordance with time. In some embodiments, the weather imaging module 318 may determine a confidence factor reflecting the degree to which weather data 317 accessed from two or more sources agree in their characterization of the weather condition. In some embodiments, the weather imaging module 318 may combine estimates of storm top height accessed from two or more sources of weather data to provide image data indicative of the vertical extent of a weather condition.

Figure 4:
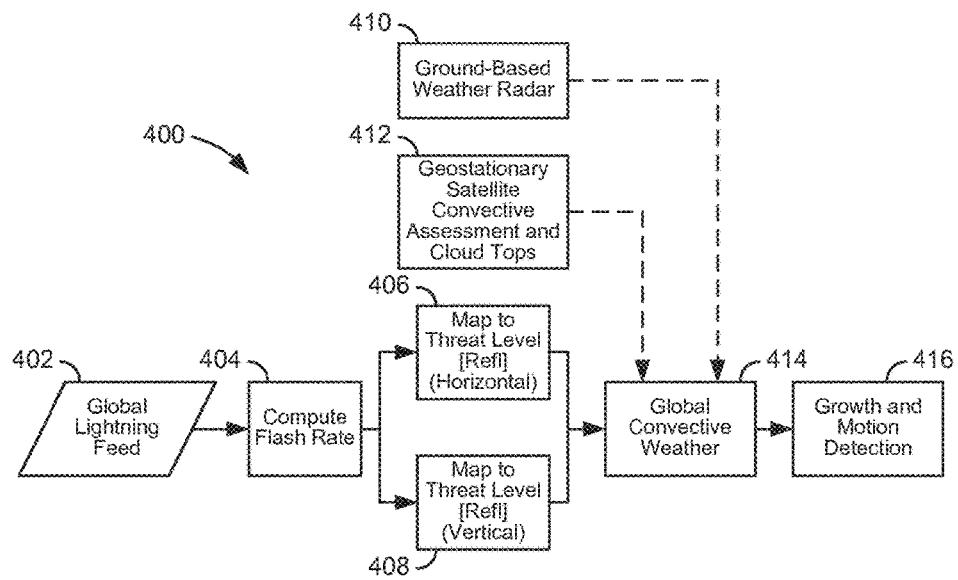
FIG. 4 is a functional flow diagram of an exemplary embodiment of a process executed in the convective weather system of FIG. 3.

With reference to FIG. 4, a process 400 shows operation of the system 300 in one exemplary embodiment. The system 300 accesses lightning data 317b from a global lightning feed or network (step 402) and the processor 208 computes a flash rate (step 404). The flash rate is used by the processor 208 with statistical data 314 to generate one or more lightning flash maps 320, which can be mapped to a horizontal reflectivity or threat level (step 406) and/or a vertical reflectivity or threat level (step 408). The system 300 accesses satellite data 316 as a geostationary satellite convective assessment and cloud top information (step 412). The system 300 may also optionally access radar return data 317a from ground-based weather radar (step 410). Alternatively or additionally, the radar return data could be received from airborne weather radar. The processor 208 generates the global convective weather threat map or assessment 324 based on the horizontal and/or vertical lightning flash maps 320, optionally the satellite data 316, and optionally the radar return data 317a (step 414). In some embodiments, the processor 208 may provide the horizontal and/or vertical lightning flash maps 320 directly to an output port for a display or for use by another system on other aircraft, handheld, or ground system. The processor 208 may detect growth and/or motion of convective cells detected in the weather threat map 324 based on a history of lightning flash maps 320, a history of weather threat maps 324, wind speeds and patterns, etc. (step 416).

Figure 5:
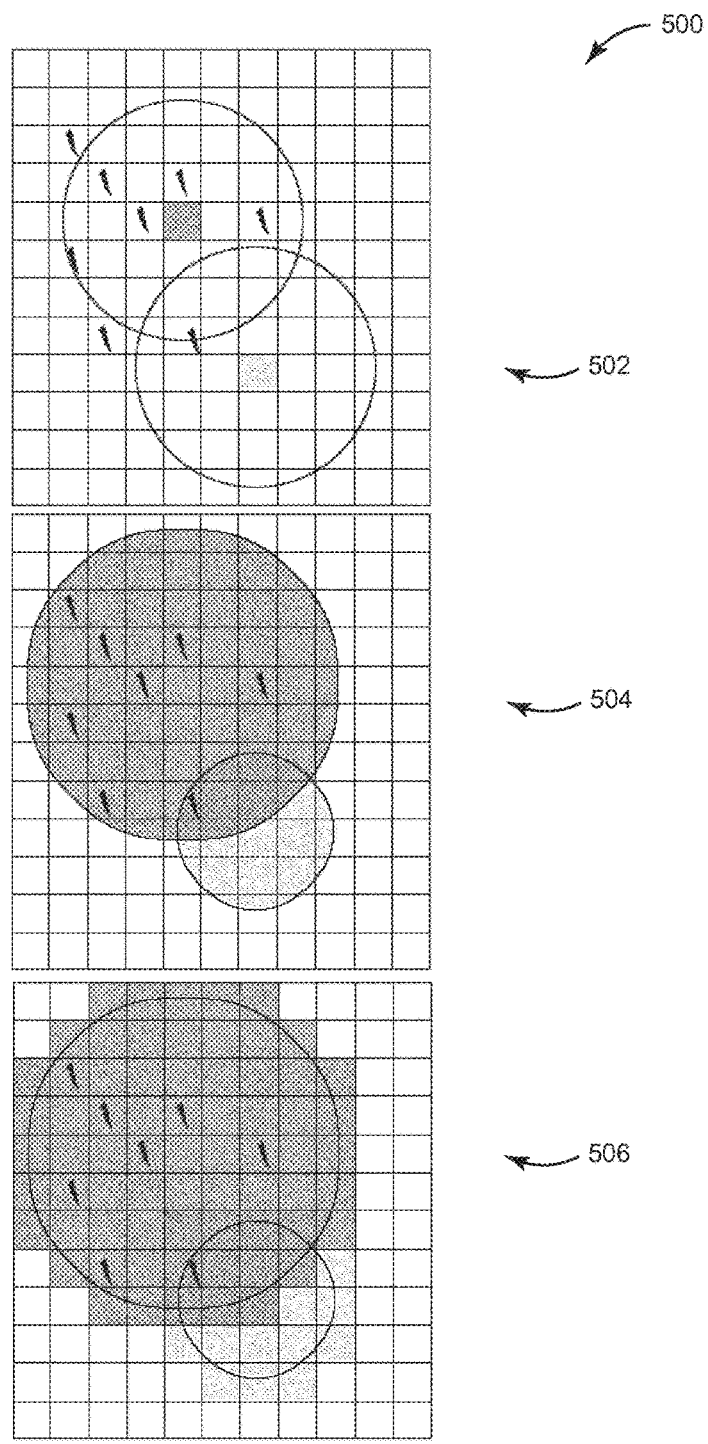
FIG. 5 is a schematic flow diagram of an exemplary embodiment of weather threat map generation in the convective weather system of FIG. 3.

With reference to FIG. 5, a process 500 illustrates how the processor 208 may generate the lightning flash map 320 according to one embodiment. At a step 502, the processor 208 generates a circle of a predetermined size (e.g., 8 km) around the center of each grid square (pixel). The processor 208 counts the number of lightning flashes within the circle and assigns a flash count or level to the square. The number of lightning flashes for each square may be represented by a numerical value, by different shading or texturing, or by different color levels. At a step 504, the processor 208 generates a new circle for each grid square (pixel) around the center of the square. The processor 208 determines the area of the new circle based on the number of the flashes counted for the square and location-dependent curves from the statistical data 314. The location-dependent curves also indicate an associated reflectivity or threat level of the circle. Processor 208 assigns a reflectivity or threat level to each circle based on the statistical data 314. Processor 208 may generate additional rings (not shown for clarity) representing other reflectivity/threat levels associated with the flash rate for each region. At a step 506, the processor 208 assigns a reflectivity or threat level to each grid square (pixel) within or touching one of the new circles based on the circle that has the highest reflectivity or threat value. For example, if a square is within overlapping circles corresponding to 30, 40, and 45 dBZ, processor 208 assigns the value of the square to 45 dBZ. The reflectivity or threat level for each grid square and each circle may be represented by a numerical value, by different shading or texturing, or by different color levels (e.g., a standard weather radar reflectivity color scheme).

Figure 6:
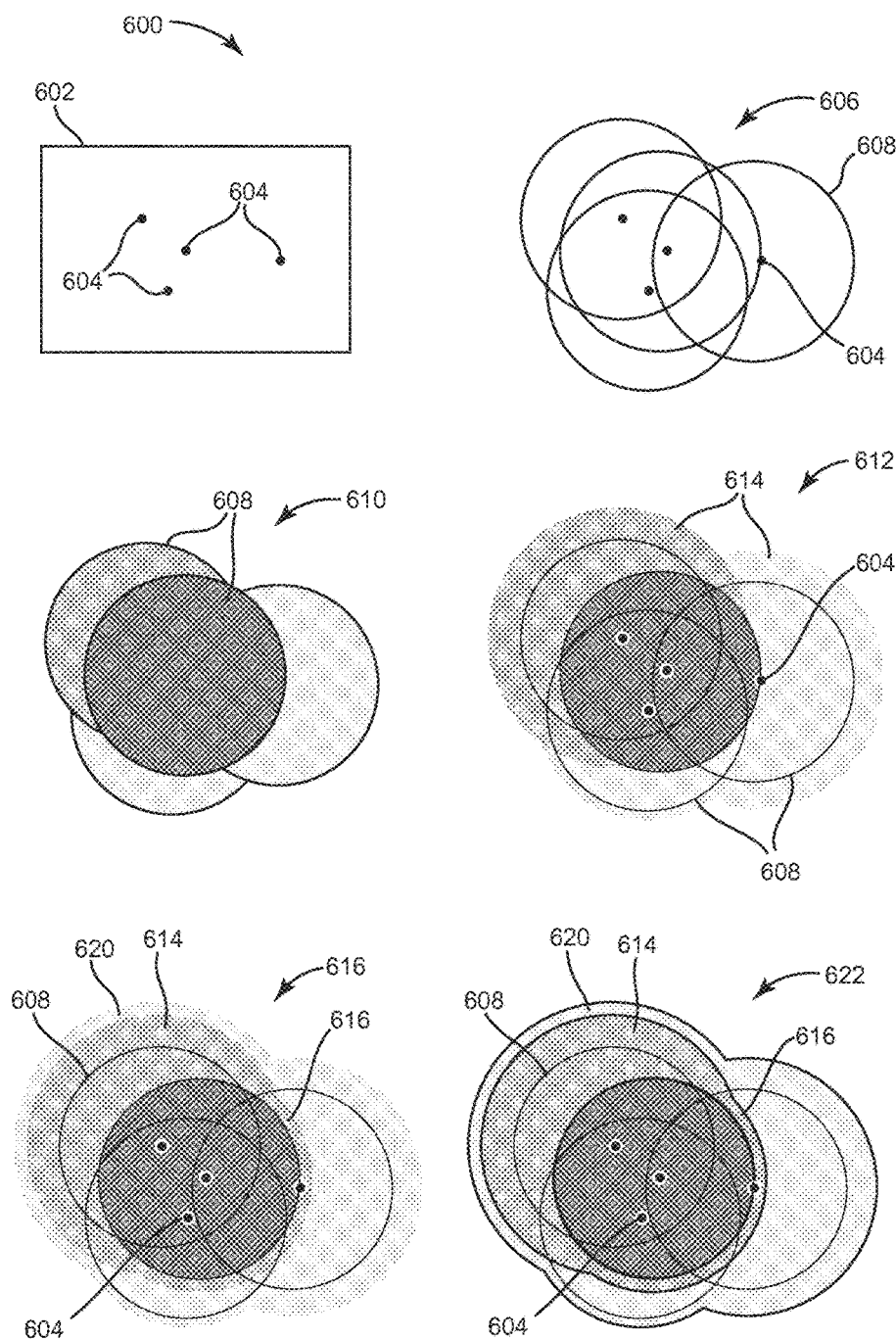
FIG. 6 is a schematic flow diagram of an exemplary embodiment of weather threat map generation in the convective weather system of FIG. 3.

Referring to FIG. 6, a process 600 illustrates how the processor 208 may generate the lightning flash map 320 according to one embodiment. At step 602, processor 208 identifies each flash, stroke, or strike 604 within a predetermined time interval (e.g., 10 minutes). At step 606, the processor 208 computes a circle 608 around each flash 604 based on the uncertainty of the lightning network data 314. For example, a smaller circle may be used to indicate more certainty in location of a lightning flash. At step 610, the processor 208 determines the flash rate within each circle 608 and color codes each circle 608 (e.g., green, yellow, or red per standard reflectivity coding schemes; indicated here as different patterns) based on the expected reflectivity for the flash rate. At step 612, the processor 208 computes a new circle or area 614 around each flash 604 and circle 608 based on calculations made from statistical data 314 using equations that express relationships between reflectivity, lightning flash rate, geographical location, and time of year (e.g., Zipser equations). At step 616, the processor 208 adds a yellow circle 618 around any red circles 614 and adds a green circle 620 around any yellow circles 614 to indicate transitional areas between reflectivity/flash rate areas. At step 622, the processor 208 is configured to smooth or blend the colors of each circle 614, 618, 620 together in transition regions for display or further processing.

While FIGS. 5 and 6 illustrate circle regions for simplicity and as a general approximation, in some embodiments the circles may be non-circular annuli (e.g., ovals) or other shapes. In some exemplary embodiments, if the processor 208 has enough data about storm forcing winds, it could adjust or skew the circles (or other symmetric shapes) to asymmetric shapes as appropriate. The color codes indicated by the texturing of FIG. 6 are configured to indicate a standard reflectivity color scheme. In some embodiments, the color scheme may be represented by textures, patterns, or other color schemes.

Figure 7:
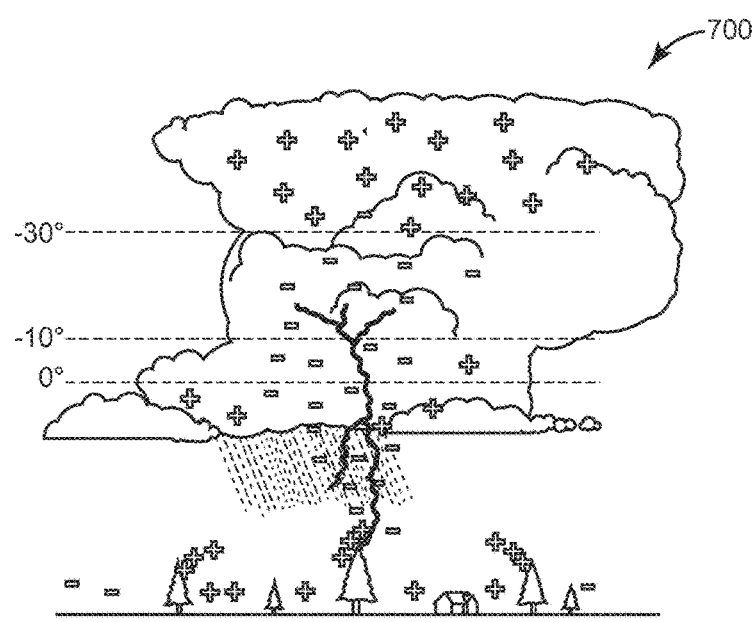
FIG. 7 is a schematic diagram of a storm cell that may be assessed by the convective weather system of FIG. 3 according.

Referring generally to FIGS. 7-11, a number of example considerations are illustrated when determining reflectivity based on lightning flash rate according to the process 600. Referring specifically to FIG. 7, a storm cell 700 illustrates that lightning flashes may have positive or negative charge, which can vary because of the convective cloud structure and how water and ice particles are moved by the convective updraft. Water within the cloud begins to freeze at zero degrees Celsius and is mixed with supercooled water, becoming only ice by −30 degrees Celsius. The temperature tends to decrease with altitude in the troposphere. Global lightning networks generally sense the strongest cloud-to-ground lightning, which may be 5-10% of all flashes. The resolution of global lightning networks flash location is about 5 km. Therefore, the smallest resolution area is $\pi(5)^2 \approx 78$ sq km. Ground flashes from convective core tend to be negative in charge, while ground flashes from the anvil tend to be positive in charge. Cloud-to-ground flashes generally average 8 km (~26,000 ft) in length. While the U.S. standard atmosphere temperature at 26,000 feet is −27° C., statistical evidence shows that one may assume that lightning originates at the levels between −15° to −25° C.

Mapping global lightning network data (e.g., lightning data 317b) to probable actual flashes requires compensation for the relatively small percentage of actual flashes detected. If the lightning sensor network can distinguish positive flashes from negative, the positive flashes can be assigned to the storm anvil and the negative flashes to the convective core. The uncertainty of the flash location from a given sensor network can be used to help define an area (e.g., the size of the area) for which to assign a specific reflectivity. The number of flashes occurring within such a circle of uncertainty within a time period is used to assign reflectivity values as shown in process 600.

Referring now to FIG. 8, illustrations are provides that give the relative sizes of convective areas for different locations/climates having the same flash rate as may be calculated by the process 600 in some embodiments. Cell 800 illustrates a resulting lightning flash map 320 for a storm cell over a tropical ocean region. Cell 802 illustrates a resulting lightning flash map 320 for a storm cell over a subtropical ocean region. Cell 804 illustrates a resulting lightning flash map 320 for a storm cell over a tropical land region. Cell 806 illustrates a resulting lightning flash map 320 for a storm cell over a subtropical land region.

Proprietary studies have shown relationships between optically detected lightning flash rates and measured radar reflectivity. The studies have shown numerical correlation coefficients between areas of radar reflectivity, temperature levels within storms, and lightning flash rate. Example tables of a simplified versions of such relationships are shown below:

| Slopes: | | | | | | | |
|---|---|---|---|---|---|---|---|
| | 20 dBz | 25 dBz | 30 dBz | 35 dBz | 40 dBz | 45 dBz | 50 dBz |
| Tropical Ocean | 1.08 | 0.71 | 0.94 | 1.26 | 1.14 | 2.46 | 4.61 |
| Subtropical Ocean | 0.01* | 0.88 | 3.71 | 6.53 | 3.49 | 1.28 | 4.73 |
| Tropical Land | 0.4 | 0.38 | 0.81 | 1.32 | 2.4 | 2.48 | 9.82 |
| Subtropical Land | 2.15 | 1.47 | 0.65 | 0.45 | 2.69 | 5.82 | 16.67 |

| Temperatures (degrees, Celsius): | | | | | | | |
|---|---|---|---|---|---|---|---|
| | 20 dBz | 25 dBz | 30 dBz | 35 dBz | 40 dBz | 45 dBz | 50 dBz |
| Tropical Ocean | −46° | −38° | −30° | −18° | −10° | −6° | +2° |
| Subtropical Ocean | −50° | −50° | −46° | −34° | −18° | −10° | −6° |
| Tropical Land | −38° | −30° | −22° | −14° | −10° | −2° | +2° |
| Subtropical Land | −38° | −30° | −18° | −10° | −10° | −6° | −2° |

| Correlation coefficients: | | | | | | | |
|---|---|---|---|---|---|---|---|
| | 20 dBz | 25 dBz | 30 dBz | 35 dBz | 40 dBz | 45 dBz | 50 dBz |
| Tropical Ocean | 0.52 | 0.63 | 0.72 | 0.77 | 0.77 | 0.69 | 0.55 |
| Subtropical Ocean | 0.74 | 0.81 | 0.85 | 0.84 | 0.85 | 0.86 | 0.75 |
| Tropical Land | 0.80 | 0.84 | 0.85 | 0.85 | 0.82 | 0.79 | 0.69 |
| Subtropical Land | 0.81 | 0.83 | 0.84 | 0.86 | 0.86 | 0.84 | 0.75 |

The derivation of these relationships is based on dividing a region under observation into units of equal area and determining the number of lightning flashes per minute within the area and the percentage of each unit of area that contained reflectivity of each value (20, 25, 30, etc. dBZ). Consequently, for a given flash rate, the area of a given reflectivity value can be derived by processor 208 using an equation based on the slope given in the first table above for that reflectivity. Because the original data were gathered in terms of radar reflectivity, this fundamental relationship is also in terms of reflectivity. The data may be further adjusted by the processor 208 to a threat level value by taking into account the variation in storm intensity associated with a given reflectivity level depending upon the geographical location (tropics, subtropics, temperate zone and oceanic or over land) and the time of year and day.

The reflectivity relationship provides an area for a given flash rate, location type, and reflectivity level, but the tables provide additional information. The correlation coefficient is an indicator of how reliable a given flash-rate to area relationship is. Depending on the situation, it may be desirable to omit reflectivity regions that have a low correlation coefficient relative to the maximum coefficient, because these relationships are less consistent.

The temperature table may allow positioning of a particular reflectivity area at a corresponding altitude. This positioning my include information regarding the temperature lapse rate of the atmosphere with altitude (pressure level), which is available from numerical forecasting and analysis models executed on the processor 208.

Referring again to FIGS. 5 and 6, an equation executed by the processor 208 can give the size of the area of a given reflectivity. In one embodiment, the processor 208 instantiates the area as a circular area. If additional information is available from satellite imagery or from winds aloft data provided by numerical models, this shape might be adjusted by the processor 208 accordingly.

If the temperature variation is disregarded as a simplification, or if two reflectivity areas lie at the same temperature level (e.g., 35 and 40 dBZ are at −10 degrees in the subtropical land case), then a technique can be implemented that allocates the various areas. The processor 208 can assign the maximum reflectivity to a circle of the area derived above. Because it is normal in weather radar images for a core region of high reflectivity to be surrounded by regions of successively lower reflectivity, the processor 208 may assign the next lower reflectivity to a circle surrounding the maximum reflectivity circle. The area of the circle is the area derived above. By assuming the areas of reflectivity are numbered from 1 to M, lowest to highest, the processor 208 can calculate the area of the maximum reflectivity inner circle and the outer radius of the circle.

In some embodiments, the processor 208 may perform the computations on a uniform grid (e.g., a 1 kilometer grid) in order to easily create a map (e.g., FIG. 5). The processor 208 calculates a reflectivity pattern with concentric circles of reflectivity at each grid square or point (or pixel). The areas of reflectivity may extend beyond the individual grid point. Consequently, the processor 208 may generate the circles for each grid square or point and assign the maximum reflectivity that overlays a given point. For example, if reflectivities of 25, 40, and 45 dBZ overlapped a point, that point or pixel's reflectivity would be set to 45 dBZ. Because points toward the outside of storm systems will have be overlapped by fewer and lower reflectivity regions, they will be assigned lower reflectivities, providing a natural look to the image when compared to conventional radar imagery.

Referring to FIG. 9, exemplary lightning flash maps are illustrated as may be calculated by the process 600 in some embodiments. When combining multiple cells, the highest intensity value present at a given point corresponds to a reflectivity coloring that should be displayed. Cells 900 illustrates multiple storm cells where the highest intensity is not always displayed. Cell 902 illustrates multiple storm cells that are properly merged according to the process 600 to show the highest intensity value at each point.

Referring to FIG. 10, a vertical reflectivity profile 1000 is illustrated as may be generated by the processor 208 during the process 400, according to some embodiments. Using Zipser equations and profiles as described above, horizontal reflectivity or a lightning flash map 320 may be generated for multiple temperatures based on lightning flash data according to process 600. Horizontal profiles 1002, 1004, and 1006 each follow the methodology of process 600, but for different temperatures. As described above, different temperatures affect the reflectivity correlations for lightning flashes. While three horizontal profiles are shown, any number of profiles may be generated depending on the desired resolution and cell height. The vertical profile can be used to generate a 3-D lightning flash map 320 and/or a 3-D weather threat map 324 for output to a 3-D display. Alternatively, the maps may be provided to separate vertical and horizontal displays. When providing to a 2-D horizontal display, the display may show the highest intensity level as illustrated in FIG. 9.

Figure 11:
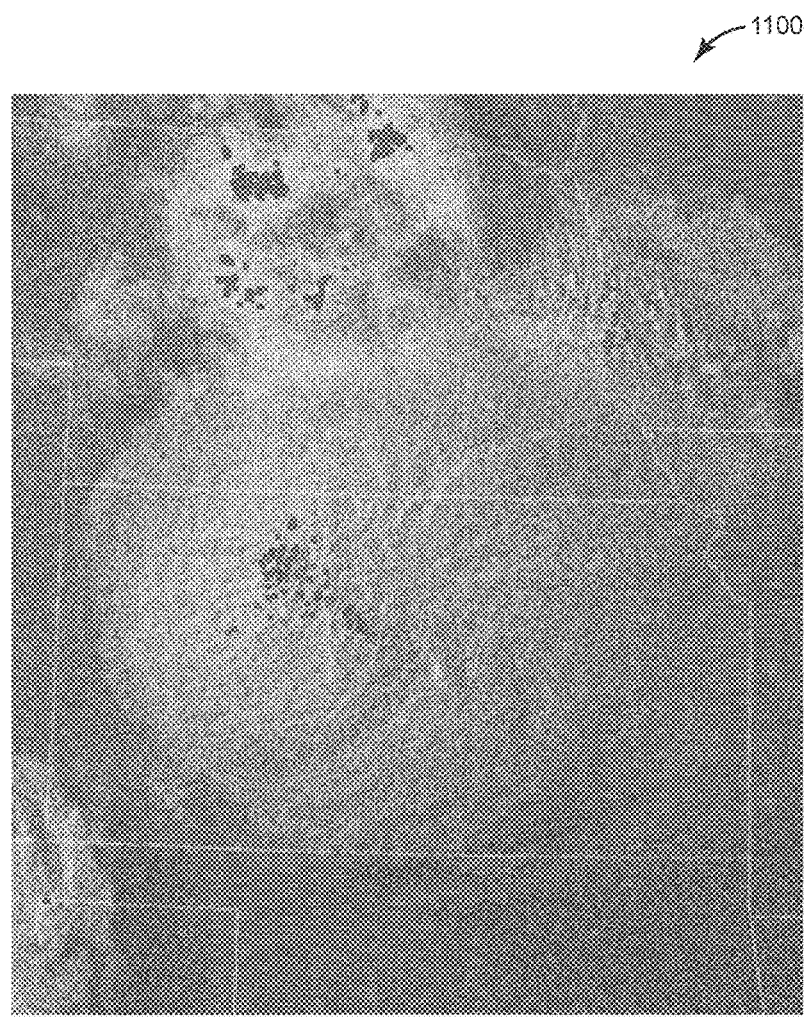
FIG. 11 is a screenshot of a satellite image according to an exemplary embodiment of the inventive concepts disclosed herein.
Figure 12:
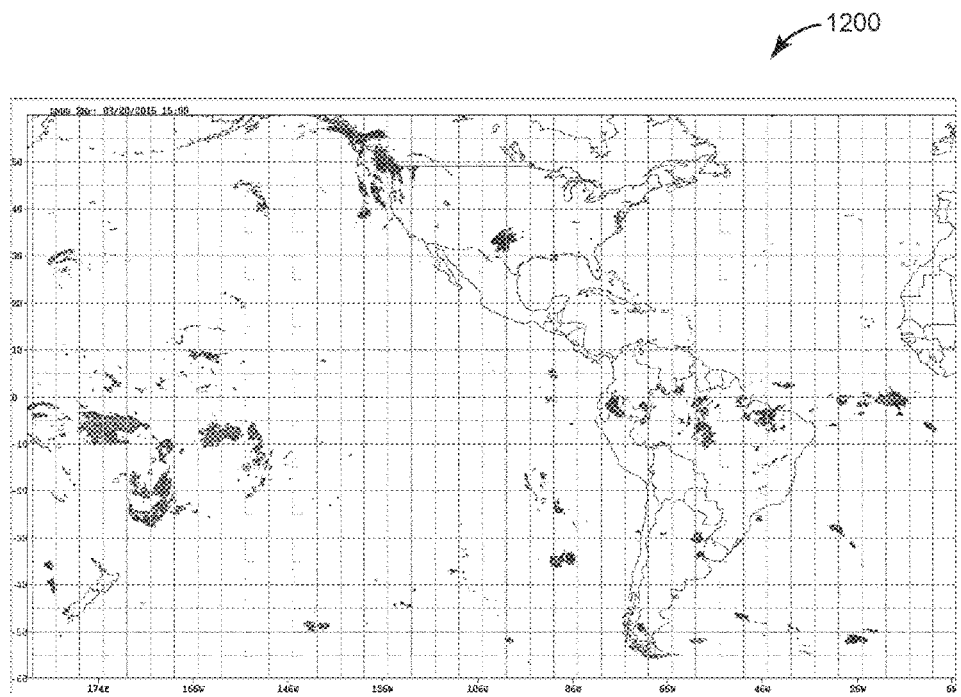
FIG. 12 is a screen shot of a convective weather satellite image that may be used by the system illustrated in FIG. 3.

FIG. 11 illustrates an exemplary infrared satellite map 1100. Satellite imagery provides several types of information including overall cloud cover, cloud type, cloud top temperature, etc. Methods for satellite detection of convection may include Convective Diagnosis Oceanic (CDO) methods and Convective Initiation Algorithm methods. Convective storms create a distinctive signature that appears as an overshooting top in map 1100. The convective regions of the standard satellite map can be derived to form a convective satellite map, such as is shown in FIG. 12, to indicate overall convective activity, but not necessarily where convective cells are located. Map 1100 may be one of several images formed by the GOES geostationary weather satellites in different bands, notably visible, long-wave infrared, and water vapor bands. Processor 208 may use various relational algorithms from two or more of these channels to derive a global convective map. For example, several steps may be taken to classify the clouds and determine the height of the cloud tops. The cloud top height information and classification information may be combined to adjust the map into a convective representation such as is shown in map 1200 of FIG. 12.

Similar to the processes described above relating lightning data, statistical data, location data, and time of year/day data, processor 208 may estimate reflectivity based on satellite data using statistical relationships between TRMM satellite radar and infrared or visible satellite features (including satellite trend data). Statistical data 314 may include statistics of a satellite related to geographic location, time of year, time of day, temperature/altitudes, etc. Processor 208 may access the statistical data 314 to derive reflectivity or threat information from the satellite statistics.

FIG. 12 illustrates an exemplary global convective satellite map 1200 that may be stored as satellite data 316. As discussed above, satellite data 316 (e.g., satellite map 1200) may be combined with lightning flash map 320 to generate an overall convective weather threat map 324. The convective regions of the standard satellite map can be derived to form a convective satellite map, such as is shown in map 1200, to indicate overall convective activity, but not necessarily where convective cells are located. While satellite detection of convective activity has been described due to its global availability, in regions where ground-based weather radar is available (e.g., the United States, Europe), data from those systems can be similarly combined with the lightning flash map 320 to form a more complete picture of convective activity. The global convective map may also be derived from a reflectivity forecast output from the Global Forecast System or similar numerical weather model that predicts convective threats and reflectivity based upon mixing potential, temperature, pressure, and atmospheric moisture content.

Figure 13:
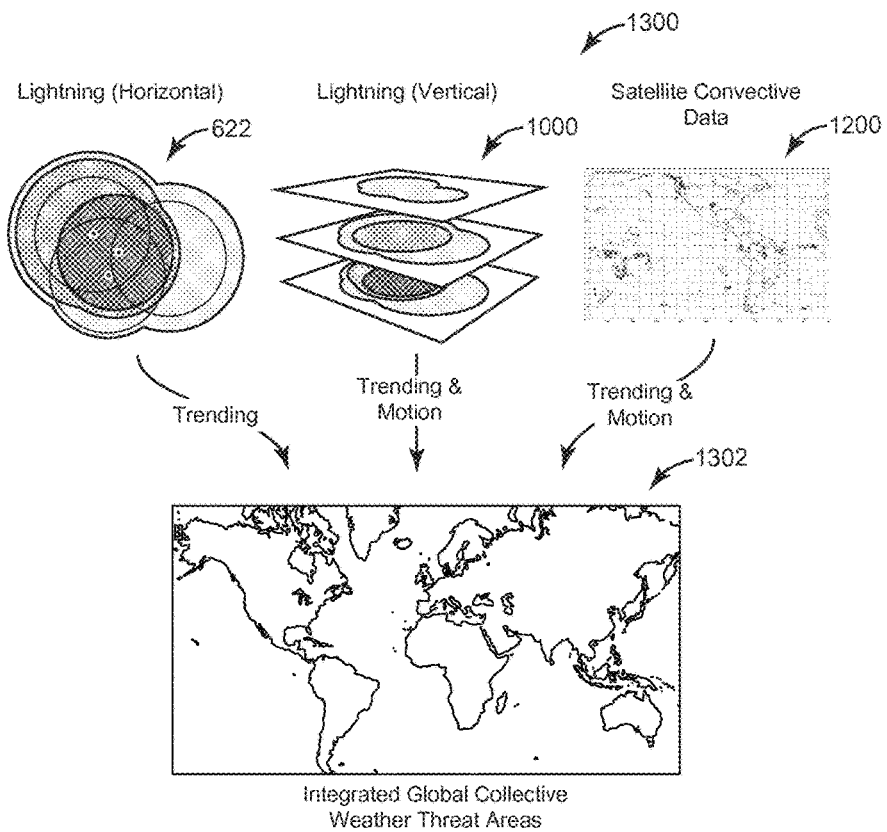
FIG. 13 is a schematic flow diagram illustrating an exemplary embodiment of a process for integrating lightning data and satellite data in the system illustrated in FIG. 3.

FIG. 13 illustrates a process 1300 that is similar to process 400 for generating weather threat map 324 according to one embodiment. The horizontal lightning profile or map from step 622 provides trending data on reflectivity for a given temperature in a convective cell based on lightning flash location and rate. Vertical lightning profile 1000 provides trending data on reflectivity for multiple temperature altitudes in a convective cell based on lightning flash location and rate as well as motion data that may be indicative of cell growth. Satellite convective data 1200 provides trending data on the overall convective activity as well as motion data (when compared with previous maps) that may be indicative of storm movement. Processor 208 combines each of the maps 622, 1000, 1200 to generate an integrated global collective weather threat area 1302 (i.e., weather threat map 324). The weather threat level map be provided as an input to the Global Forecast System or similar forecasting systems or tools to generate a reflectivity or convective forecast based upon integrated satellite derived reflectivity, lightning derived reflectivity, and numerical weather model conditions.

Figure 14:
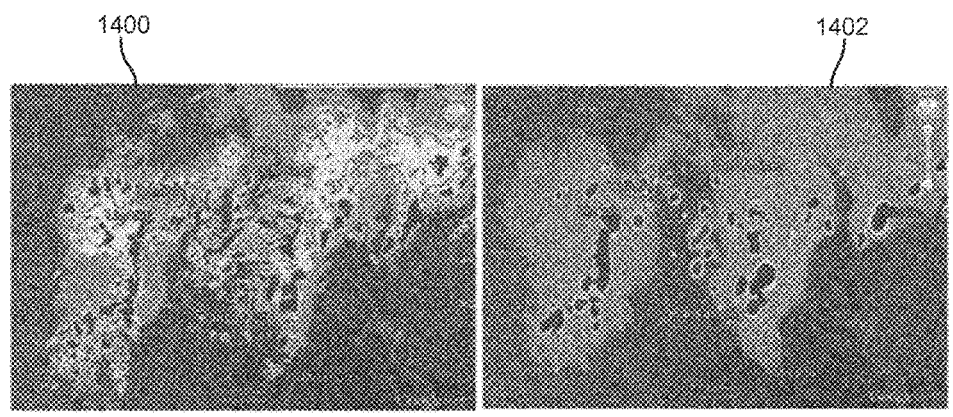
FIG. 14 is a screen shot of a comparison between existing weather threat maps and a weather threat map generated by the system illustrated in FIG. 3.

FIG. 14 illustrates an exemplary comparison of a conventional satellite map and weather threat map 324 (e.g., the weather threat map 1302). A map 1402 is a U.S. NEXRAD vertically integrated liquid weather map while map 1404 is an exemplary weather map 324 that makes use of TRMM lightning/reflectivity relationships and satellite global convective diagnostic images according to an exemplary embodiment of the inventive concepts disclosed herein. The map 1402 more accurately indicates where the convective center and threat area extent of storms are than conventional methods. The map 1402 may also provide more accurate weather trend and motion information that can be used for more accurate nowcast/forecast information by aircraft pilots and/or weather avoidance systems.

Figure 15:
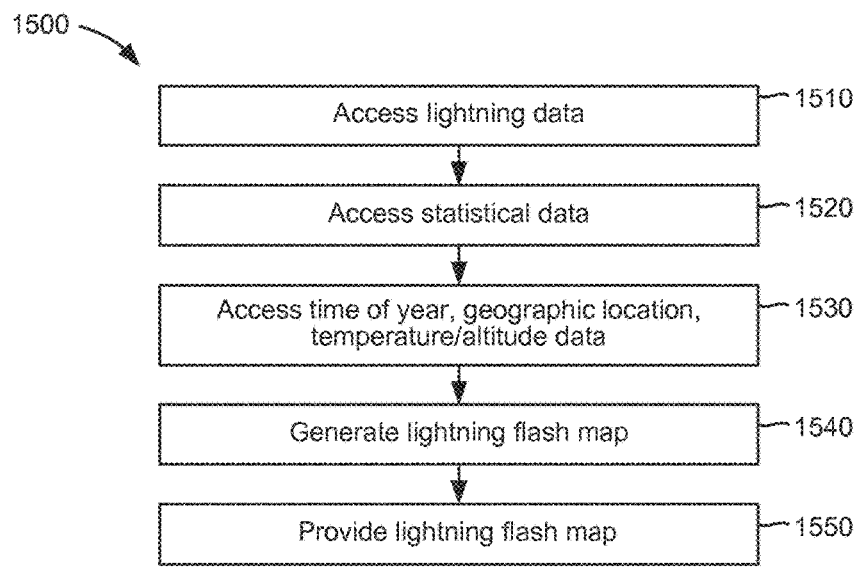
FIG. 15 is a functional flow diagram showing an exemplary embodiment of a process for generating and providing a weather threat level map in the system illustrated in FIG. 3.

Referring to FIG. 15, a method 1500 is illustrated for generating a weather threat map 324 and providing it for display or use by another system, according to one embodiment. The processor 208 accesses lightning data 317b (step 1510), accesses numerical weather model or statistical data 314 (step 1520) from memory 206 or from communications system 216, and accesses time of year, geographic, and/or temperature or altitude data (step 1530) from memory 206, from communications system 216, or from sensors 203. The processor 208 generates a lightning flash map 320 based on accessed lightning data 317b and statistical data 314 (step 1540) as described herein. The processor 208 provides the generated lightning flash map 320 to an output port for display on a local or remote electronic display, for example display 210 on aircraft 201 or a display on handheld device 222, and/or to at least one of a weather avoidance decision support system and an automated weather avoidance or rerouting system located in an aircraft 201,230,240, on the handheld device 222, or at the terrestrial station 220. (step 1550).

Figure 16:
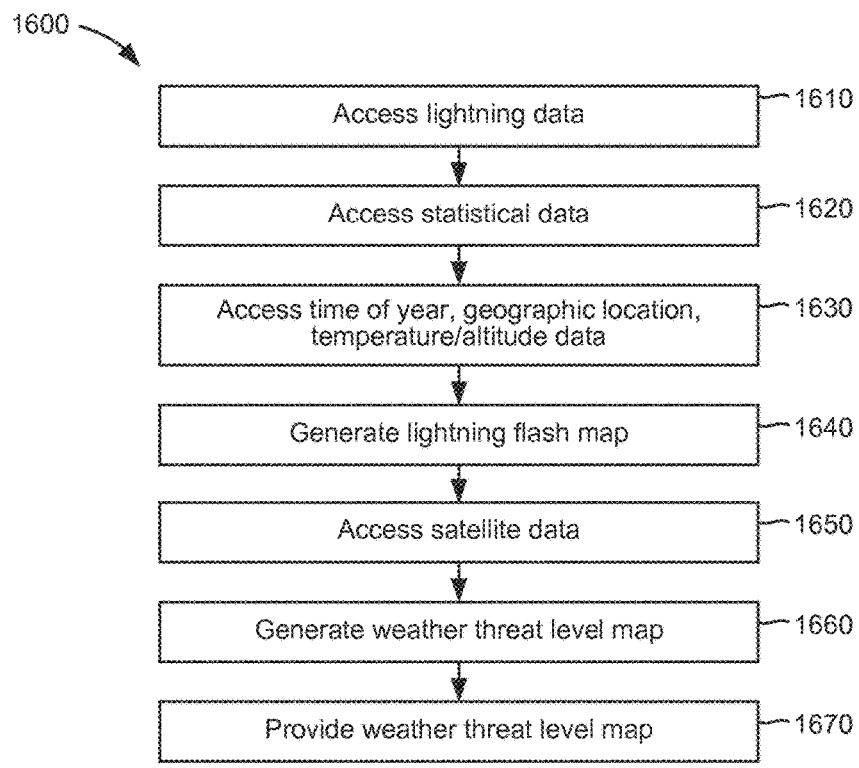
FIG. 16 is a functional flow diagram showing an exemplary embodiment of a process for generating and providing a weather threat level map in the system illustrated in FIG. 3.

Referring to FIG. 16, a method 1600 is illustrated for generating a weather threat map 324 and providing it for display or use by another system, according to one embodiment. The processor 208 accesses lightning data 317b (step 1610), accesses numerical weather model or statistical data 314 (step 1620) from memory 206 or from communications system 216, and accesses time of year, geographic, and/or temperature or altitude data (step 1630) from memory 206, from communications system 216, or from sensors 203. The processor 208 generates a lightning flash map 320 based on accessed lightning data 317b and statistical data 314 (step 1640) as described herein. The processor 208 also accesses satellite data 316 from memory 206 or from communications system 216 (step 1650). The processor 208 generates weather threat level map 324 (e.g., an integrated global convective weather map) based on the accessed satellite data 316 and generated lightning flash map 320 (step 1660). The processor 208 provides the generated weather threat level map 324 to an output port for display on a local or remote electronic display, for example display 210 on aircraft 201 or a display on handheld device 222, and/or to at least one of a weather avoidance decision support system and an automated weather avoidance or rerouting system located in an aircraft 201,230,240, on the handheld device 222, or at the terrestrial station 220. (step 1670).

Figure 17:
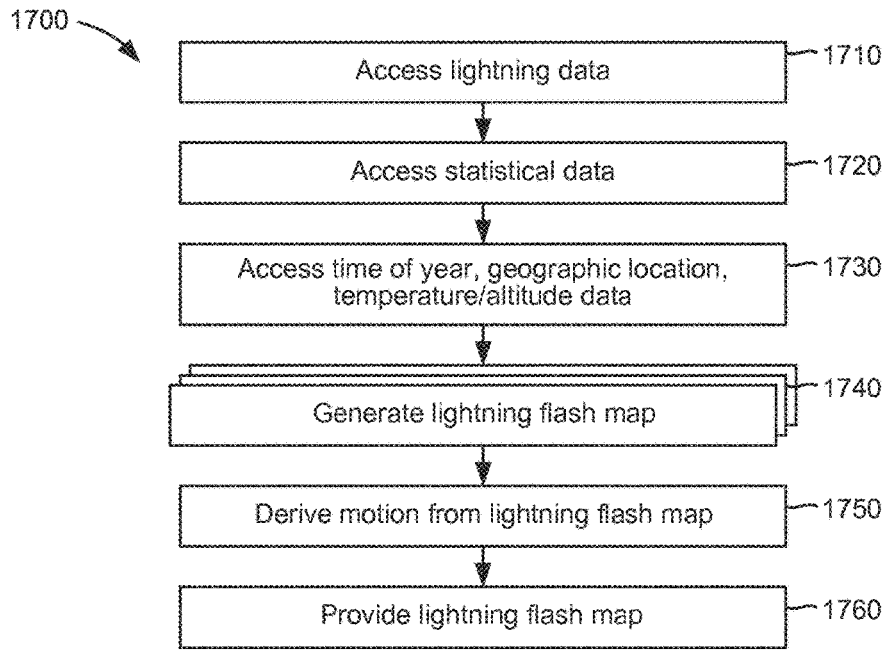
FIG. 17 is a functional flow diagram showing an exemplary embodiment of a process for generating and providing a weather threat level map in the system illustrated in FIG. 3.

Referring to FIG. 17, a method 1700 is illustrated for generating a weather threat map 324 and providing it for display or use by another system, according to one embodiment. The processor 208 accesses lightning data 317b (step 1710), accesses numerical weather model or statistical data 314 (step 1720) from the memory 206 or from the communications system 216, and accesses time of year, geographic, and/or temperature or altitude data (step 1730) from memory 206, from communications system 216, or from sensors 203. The processor 208 generates multiple lightning flash maps 320 based on accessed successive lightning data 317b and statistical data 314 (step 1740) as described herein. The processor 208 derives motion data from the multiple lightning flash maps 320 (step 1750) that can be used to indicate how convective cells are moving or growing. The processor 208 provides the generated one or more lightning flash maps 320 and derived motion data to an output port for display on a local or remote electronic display, for example display 210 on aircraft 201 or a display on handheld device 222, and/or to at least one of a weather avoidance decision support system and an automated weather avoidance or rerouting system located in an aircraft 201,230,240, on the handheld device 222, or at the terrestrial station 220. (step 1760). In one embodiment, the one or more lightning flash maps 320 may be modified by the motion data to indicate a forecast or nowcast of convective weather.

Figure 18:
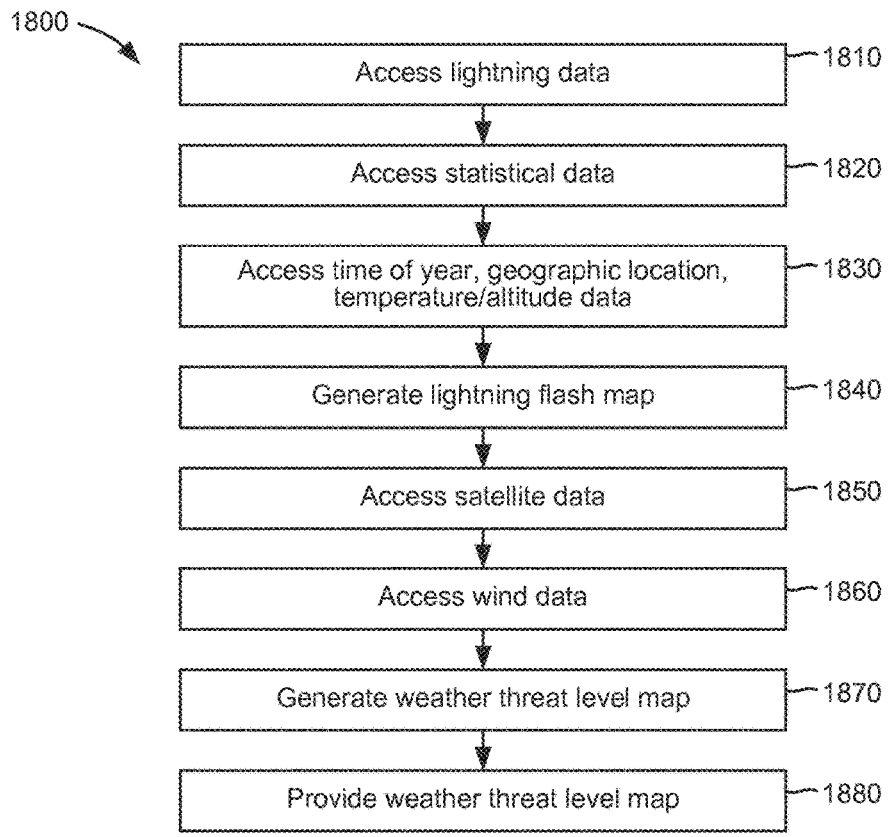
FIG. 18 is a functional flow diagram showing an exemplary embodiment of a process for generating and providing a weather threat level map in the system illustrated in FIG. 3.

Referring to FIG. 18, a method 1800 is illustrated for generating a weather threat map 324 and providing it for display or use by another system, according to one embodiment. The processor 208 accesses lightning data 317b (step 1810), accesses weather model or statistical data 314 (step 1820) from memory 206 or from communications system 216, and accesses time of year, geographic, and/or temperature or altitude data (step 1830) from memory 206, from communications system 216, or from sensors 203. The processor 208 generates a lightning flash map 320 based on accessed lightning data 317b and statistical data 314 (step 1840) as described herein. The processor 208 also accesses satellite data 316 from the memory 206 or from the communications system 216 (step 1850) and accesses wind data (step 1860) from the memory 206, from the communications system 216, or from the sensors 203. The processor 208 generates weather threat level map 324 (e.g., an integrated global convective weather map) based on the accessed satellite data 316, accessed wind data, the numerical weather model, and generated lightning flash map 320 (step 1870). The wind data may be used to adjust the satellite data for movement because of the latency in the satellite data from between the time the data was captured and the time the data was accessed. The processor 208 provides the generated weather threat level map 324 to an output port for display on a local or remote electronic display, for example display 210 on aircraft 201 or a display on handheld device 222, and/or to at least one of a weather avoidance decision support system and an automated weather avoidance or rerouting system located in an aircraft 201,230,240, on the handheld device 222, or at the terrestrial station 220. (step 1880).

Figure 19:
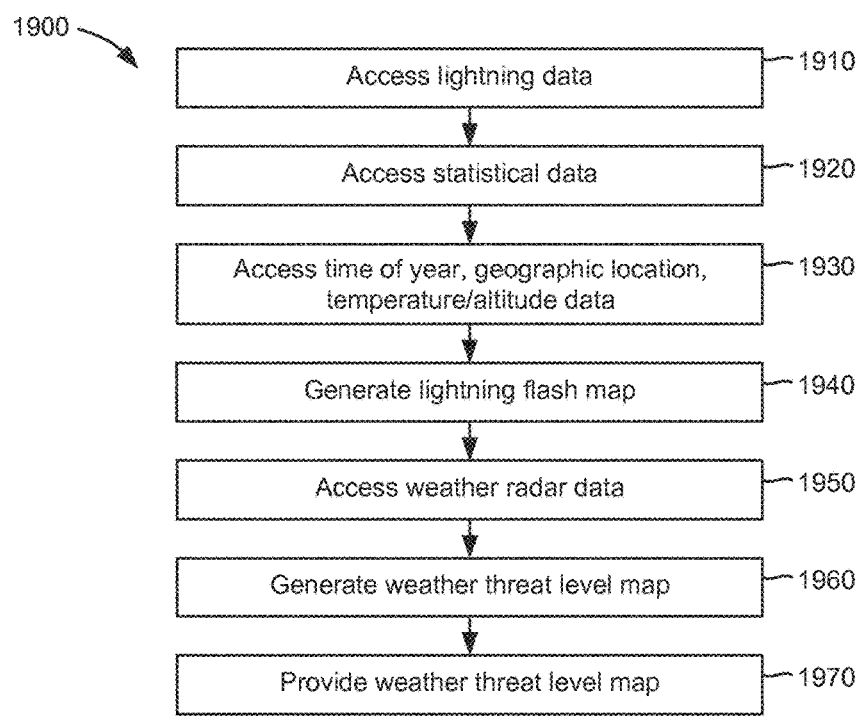
FIG. 19 is a functional flow diagram showing an exemplary embodiment of a process for generating and providing a weather threat level map in the system illustrated in FIG. 3.

Referring to FIG. 19, a method 1900 is illustrated for generating a weather threat map 324 and providing it for display on the display 210 or a display of the handheld device 222, according to one embodiment. The processor 208 accesses lightning data 317b (step 1910), accesses weather model or statistical data 314 (step 1920) from the memory 206 or from the communications system 216, and accesses time of year, geographic, and/or temperature or altitude data (step 1930) from memory 206, from communications system 216, or from sensors 203. The processor 208 generates a lightning flash map 320 based on accessed lightning data 317b and statistical data 314 (step 1940) as described herein. The processor 208 also accesses weather radar data or radar return data 317a (step 1950) from the memory 206, from the communications system 216, or from the weather radar 202. The processor 208 generates weather threat level map 324 (e.g., an integrated global convective weather map) based on the accessed satellite data 316, accessed radar return data 317a, and generated lightning flash map 320 (step 1960). Radar return data may be used to further refine or more accurately detail various aspects of convective cells including cell height, spectral width, reflectivity, etc. for weather threat level map 324. In some embodiments, processor 208 may also access satellite data 316 and combine the satellite data 316 with the lightning threat map 320 and the radar return data to generate the weather threat map 324. The processor 208 provides the generated weather threat level map 324 to an output port for display on a local or remote electronic display, for example display 210 on aircraft 201 or a display on handheld device 222, and/or to at least one of a weather avoidance decision support system and an automated weather avoidance or rerouting system located in an aircraft 201,230,240, on the handheld device 222, or at the terrestrial station 220. (step 1970).

In some embodiments, processor 208 combine satellite based reflectivity/threats, lightning derived reflectivity/threats, and numerical weather model reflectivity/threats to generate weather threat map 324 using the maximum or average threat value based upon the contributions of each source. The processor 208 may combine or weight the source data using statistics to determine a weighting based upon the historical statistical relationship between the threat levels of each source and geographic location, time day, time of year, altitude and temperature. For example, over the pacific ocean, the satellite infrared height in excess of 30,000 ft. agl and presence of Global Forecast Reflectivity along with the presence of lightning indicates an area of higher reflectivity and higher threat level.

According to various exemplary embodiments, the process flow of FIGS. 4, 5, 6, and 17-22, may be embodied as hardware and/or software. In exemplary embodiments where the processes are embodied as software, the processes may be executed as computer code on any processing or hardware architecture or in any weather radar system such as the WXR-2100 available from Rockwell Collins.

While the detailed drawings, specific examples, detailed algorithms and particular configurations given describe preferred and exemplary embodiments, they serve the purpose of illustration only. The inventive concepts disclosed herein are not limited to the specific forms shown. For example, the methods may be performed in any of a variety of sequence of steps or according to any of a variety of mathematical formulas. The graphic representations shown are exemplary only. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types, graphical symbols and operations are shown in a non-limiting fashion. Further, other substitutions, modifications, changes, and omissions may be made in the design, operating conditions, and arrangement of the exemplary embodiments without departing from the broad scope of the inventive concepts disclosed herein as expressed in the appended claims.

What is claimed is:

1. A method of providing convective weather data in an avionic weather system comprising a weather radar system, the method comprising:
   accessing lightning data;
   accessing statistical data representing a relationship between lightning flash rate data and at least one of reflectivity data and weather threat data;
   accessing at least one of time of year data, geographic location data, temperature data, and altitude data;
   generating a lightning flash map based on the accessed lightning data, the accessed statistical data, and the at least one of time of year data, geographic location data, temperature data, and altitude data, the lightning flash map indicating at least one of reflectivity and a weather threat;
   providing first weather radar beams from a radar antenna at a first vertical angle;
   providing second weather radar beams from the radar antenna at a second vertical angle;
   receiving radar returns associated with the first weather radar beams and the second weather radar beams;
   processing the radar returns from the first weather radar beams and the second weather radar beams to obtain weather radar data using the weather radar system, the weather radar data comprising weather height information;
   accessing the weather radar data;
   generating a weather threat level map by combining the lightning flash map and the weather radar data; and
   providing the weather threat level map to an output port, wherein the weather threat level map is provided by the output port to a forecasting system, the forecasting system generating a reflectivity or convective forecast based on satellite derived reflectivity, lightning derived reflectivity, and numerical weather model conditions.

2. The method of claim 1, comprising:
   accessing wind data indicating a weather motion vector; and
   combining the weather threat level map with the wind data to predict a location of convective weather.

3. The method of claim 1, comprising:
   comparing successive lightning flash maps for changes;
   deriving motion information from changes in the successive lightning flash maps; and
   adjusting the lightning flash map based on the motion information, the adjusting comprising at least one of compensating the lightning flash map for latency and providing a weather prediction on the lightning flash map.

4. The method of claim 1, wherein the output port provides the lightning flash map to at least one of an electronic display, a weather avoidance decision support system, and an automated weather avoidance or rerouting system located in an aircraft, on a handheld device, or at a terrestrial station.

5. The method of claim 1, wherein the lightning flash map comprises standard weather reflectivity threat levels.

6. The method of claim 1, wherein the lightning flash map comprises at least one of horizontal reflectivity data and vertical reflectivity data.

7. A method of providing convective weather data in an avionic weather system comprising a weather radar system, the method comprising:
   providing first weather radar beams from a radar antenna at a first vertical angle;
   providing second weather radar beams from the radar antenna at a second vertical angle;
   receiving radar returns associated with the first weather radar beams and the second weather radar beams;
   processing the radar returns from the first weather radar beams and the second weather radar beams to obtain weather radar data using the weather radar system, the weather radar data comprising weather height information;
   accessing lightning data;
   accessing statistical data representing a relationship between lightning flash rate data and at least one of reflectivity data and weather threat data associated with the weather radar data;
   accessing at least one of time of year data, geographic location data, temperature data, and altitude data;

generating a lightning flash map based on the accessed lightning data, the accessed statistical data, and the at least one of time of year data, geographic location data, temperature data, and altitude data, the lightning flash map indicating at least one of reflectivity and a weather threat;

accessing satellite data indicating convective activity;

generating a weather threat level map by combining the lightning flash map the weather radar data, and the satellite data;

providing the weather threat level map to an output port; and accessing global statistical data representing a relationship between satellite infrared or visible data and the at least one of reflectivity and weather threats, wherein the generating the weather threat level map comprises weighting the satellite data, the lightning flash map, and the statistical data based on a respective threat level relationship defined by the global statistical data and the at least one of time of year data, geographic location data, temperature data, and altitude data.

8. The method of claim 7, wherein the weather threat level map is provided by the output port to a forecasting system, the forecasting system generating a reflectivity or convective forecast based on satellite derived reflectivity, lightning derived reflectivity, and numerical weather model conditions.

9. The method of claim 1, comprising:
generating the weather threat level map by combining satellite data, the lightning flash map and the weather radar data.

10. A weather processing device comprising an avionic weather radar system for providing weather radar beams from a radar antenna to provide weather radar data, the weather processing device comprising:
at least one processor configured to:
provide first weather radar beams from the radar antenna at a first vertical angle;
provide second weather radar beams from the radar antenna at a second vertical angle;
receive radar returns associated with the first weather radar beams and the second weather radar beams;
process the radar returns from the first weather radar beams and the second weather radar beams to obtain the weather radar data using the weather radar system, the weather radar data comprising at least one of reflectivity information at different heights and weather threat information;
access lightning data;
access statistical data representing a relationship between lightning flash rate data and at least one of reflectivity data and weather threat data;
access at least one of time of year data, geographic location data, temperature data, and altitude data;
generate a lightning flash map based on the accessed lightning data, the accessed statistical data, and the at least one of time of year data, geographic location data, temperature data, and altitude data, the lightning flash map indicating at least one of reflectivity and a weather threat; and
an output port coupled with the at least one processor and configured to provide the lightning flash map to at least one of a display, a weather avoidance decision support system, and an automated weather avoidance or rerouting system, wherein the at least one processor is configured to:

compare successive lightning flash maps for changes;
derive motion information from changes in the successive lightning flash maps; and
adjust the lightning flash map based on the motion information, the adjusting the lightning flash map comprising at least one of compensating the lightning flash map for latency and providing a weather prediction on the lightning flash map;
generate a weather threat level map by combining the lightning flash map and the weather radar data.

11. The device of claim 10, wherein the at least one processor is configured to:
access satellite data indicating convective activity;
generate the weather threat level map by combining the lightning flash map and the satellite data, and
wherein the output port is configured to provide the weather threat level map to at least one of the display, the weather avoidance decision support system, and the automated weather avoidance or rerouting system.

12. The device of claim 11, wherein the at least one processor is configured to:
access wind data indicating a weather motion vector; and
combine the weather threat level map with the wind data to predict a location of convective weather.

13. The device of claim 10, wherein the at least one processor is configured to:
wherein the output port is configured to provide the weather threat level map to at least one of the display, the weather avoidance decision support system, and the automated weather avoidance or rerouting system.

14. The device of claim 10, wherein the weather threat level map comprises standard weather reflectivity threat levels.

15. The device of claim 10, wherein the display is located in an aircraft, a handheld device, or a terrestrial station and the at least one processor is remote from the display.

16. The device of claim 10, wherein the weather threat level map comprises at least one of horizontal reflectivity data and vertical reflectivity data.

17. A weather processing device for an avionic weather system comprising:
at least one processor configured to:
provide first weather radar beams from a radar antenna at a first vertical angle;
provide second weather radar beams from the radar antenna at a second vertical angle;
receive radar returns associated with the first weather radar beams and the second weather radar beams;
process the radar returns from the first weather radar beams and the second weather radar beams to obtain weather radar data using the weather radar system, the weather radar data comprising weather height information;
access lightning data;
access statistical data representing a relationship between lightning flash rate data and at least one of reflectivity data and weather threat data;
access at least one of time of year data, geographic location data, temperature data, and altitude data;
generate a lightning flash map based on the accessed lightning data, the accessed statistical data, and the at least one of time of year data, geographic location data, temperature data, and altitude data, the lightning flash map indicating at least one of a first reflectivity and a first weather threat; and
an output port coupled with the at least one processor and configured to provide the lightning flash map to at least one of a display, a weather avoidance decision support system, and an automated weather avoidance or rerouting system, wherein the at least one processor is configured to:

access satellite data indicating convective activity;

generate a weather threat level map by combining the lightning flash map, the weather radar data, and the satellite data, and wherein the output port is configured to provide the weather threat level map to at least one of the display, the weather avoidance decision support system, and the automated weather avoidance or rerouting system; and wherein the at least one processor is configured to access global statistical data representing a relationship between satellite infrared or visible data and at least one of reflectivity associated with the weather radar data and weather threats; and derive at least one of reflectivity and weather threat data based on the satellite data using the global statistical data, the at least one of reflectivity and weather threat data based on the satellite data being used to generate the weather threat level map.

18. The device of claim 17, wherein the at least one processor is configured to:

compare successive lightning flash maps for changes;

derive motion information from changes in the successive lightning flash maps; and adjust the lightning flash map based on the motion information, the adjusting the lightning flash map comprising at least one of compensating the lightning flash map for latency and providing a weather prediction on the lightning flash map.

19. A weather processing system for an aircraft including a weather radar system, comprising:

at least one processor configured to:

provide first weather radar beams from a radar antenna at a first vertical angle;

provide second weather radar beams from the radar antenna at a second vertical angle;

receive radar returns associated with the first weather radar beams and the second weather radar beams;

process the radar returns from the first weather radar beams and the second weather radar beams to obtain weather radar data using the weather radar system, the weather radar data comprising weather height information;

access lightning data;

access statistical data representing a relationship between lightning flash rate data and at least one of reflectivity data and weather threat data;

access at least one of time of year data, geographic location data, temperature data, and altitude data;

generate a lightning flash map based on the accessed lightning data, the accessed statistical data, and the at least one of time of year data, geographic location data, temperature data, and altitude data, the lightning flash map indicating at least one of reflectivity and a weather threat;

access satellite data indicating convective activity; and generate a weather threat level map by combining the weather radar data, the satellite data and the lightning flash map; and an output port coupled with the at least one processor and configured to provide the weather threat level map to at least one of a display, a weather avoidance decision support system, and an automated weather avoidance or rerouting system, wherein the at least one processor is configured to access global statistical data representing a relationship between satellite infrared or visible data and at least one of reflectivity and weather threats, wherein the at least one processor is configured to generate the weather threat level map by weighting the satellite data, the lightning flash map, and the statistical data based on a respective threat level relationship defined by the global statistical data and the at least one of time of year data, geographic location data, temperature data, and altitude data.

20. The system of claim 19, generate the weather threat level map as a global map.

* * * * *